(12) United States Patent
Kori et al.

(10) Patent No.: US 7,263,274 B2
(45) Date of Patent: Aug. 28, 2007

(54) RECORDING MEDIUM CARTRIDGE WITH MEMORY CIRCUIT EMPLOYING A HIERARCHICAL DATA STRUCTURE

(75) Inventors: Teruhiko Kori, Kanagawa (JP); Harumi Kawamura, Tokyo (JP); Hisato Shima, Chiba (JP); Kazuyuki Ogawa, Kanagawa (JP)

(73) Assignee: Sony Corporation, Tokyo (JP)

(*) Notice: Subject to any disclaimer, the term of this patent is extended or adjusted under 35 U.S.C. 154(b) by 308 days.

(21) Appl. No.: 11/093,575

(22) Filed: Mar. 30, 2005

(65) Prior Publication Data
US 2005/0169124 A1 Aug. 4, 2005

Related U.S. Application Data

(63) Continuation of application No. 09/596,174, filed on Jun. 16, 2000, now Pat. No. 6,922,520.

(51) Int. Cl.
*H04N 7/00* (2006.01)
*H04N 5/91* (2006.01)

(52) U.S. Cl. .......................... 386/46; 386/81

(58) Field of Classification Search ............ 386/46, 386/124, 125, 83, 104, 52, 81, 40, 39; 360/131, 360/132, 134
See application file for complete search history.

(56) References Cited

U.S. PATENT DOCUMENTS

| | | |
|---|---|---|
| 4,338,644 A | 7/1982 | Staar |
| 4,383,285 A | 5/1983 | Staar |
| 4,723,181 A | 2/1988 | Hickok |
| 4,814,924 A | 3/1989 | Ozeki |
| 4,939,595 A | 7/1990 | Yoshimoto et al. |
| 5,291,301 A | 3/1994 | Lee |

(Continued)

FOREIGN PATENT DOCUMENTS

EP 0 344 626 12/1989

(Continued)

OTHER PUBLICATIONS

Patent Abstracts of Japan, vol. 12, No. 423 (E-680) Nov. 9, 1988 & JP-A-63 158 984 (JVC LTD) Jul. 1, 1988.

(Continued)

*Primary Examiner*—Robert Chevalier
(74) *Attorney, Agent, or Firm*—Frommer Lawrence & Haug LLP; William S. Frommer; Thomas F. Presson

(57) ABSTRACT

A recording medium cartridge includes a memory circuit for storing information concerning signals recorded on the recording medium within the cartridge. The information is stored in the memory circuit in the form of a hierarchic data structure which includes a plurality of data packets having a predetermined form and length. Each data packet includes a code indicative of a level in the data structure to which the data packet belongs. At least some of the data packets include data indicative of starting and ending positions on the recording medium of recorded signals which the data packet represents. The hierarchic (or "tree") data structure facilitates rapid retrieval and reproduction of the signals recorded on the recording medium, particularly when the recording medium is a magnetic tape. The tree structure also facilitates storage of information in connection with recording of additional signals on the recording medium.

1 Claim, 27 Drawing Sheets

U.S. PATENT DOCUMENTS

| | | |
|---|---|---|
| 5,325,370 A | 6/1994 | Cleveland et al. |
| 5,384,674 A | 1/1995 | Nishida et al. |
| 5,388,016 A | 2/1995 | Kanai et al. |
| 5,488,409 A | 1/1996 | Yuen et al. |
| 5,594,601 A | 1/1997 | Mimick et al. |
| 5,636,078 A | 6/1997 | Tsai |
| 5,786,955 A | 7/1998 | Kori et al. |
| 5,791,578 A * | 8/1998 | Kurokawa et al. ....... 242/338.3 |
| 5,822,024 A | 10/1998 | Setogawa et al. |
| 5,956,453 A | 9/1999 | Yaegashi et al. |
| 5,956,458 A | 9/1999 | Sezan et al. |
| 6,016,380 A | 1/2000 | Norton |
| 6,118,925 A | 9/2000 | Murata et al. |
| 6,289,169 B1 | 9/2001 | Okuyama |
| 6,324,338 B1 | 11/2001 | Wood et al. |
| 6,327,109 B1 | 12/2001 | Kori et al. |
| 6,430,355 B1 | 8/2002 | Nagasawa |
| 6,556,768 B1 | 4/2003 | Nakajima et al. |
| 6,601,237 B1 | 7/2003 | Ten Kate et al. |

FOREIGN PATENT DOCUMENTS

| | | |
|---|---|---|
| WO | WO89 10615 | 11/1989 |

OTHER PUBLICATIONS

"Operating Systems, A Systematic View" by William S. Davis, May 1987, pp. 25-26 and 142-143.

* cited by examiner

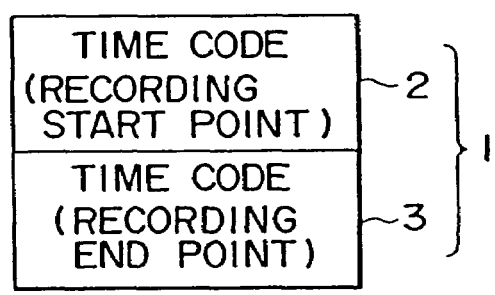
FIG. 1(a)
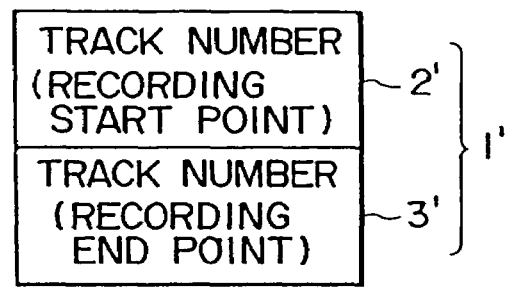
FIG. 1(b)
FIG. 2
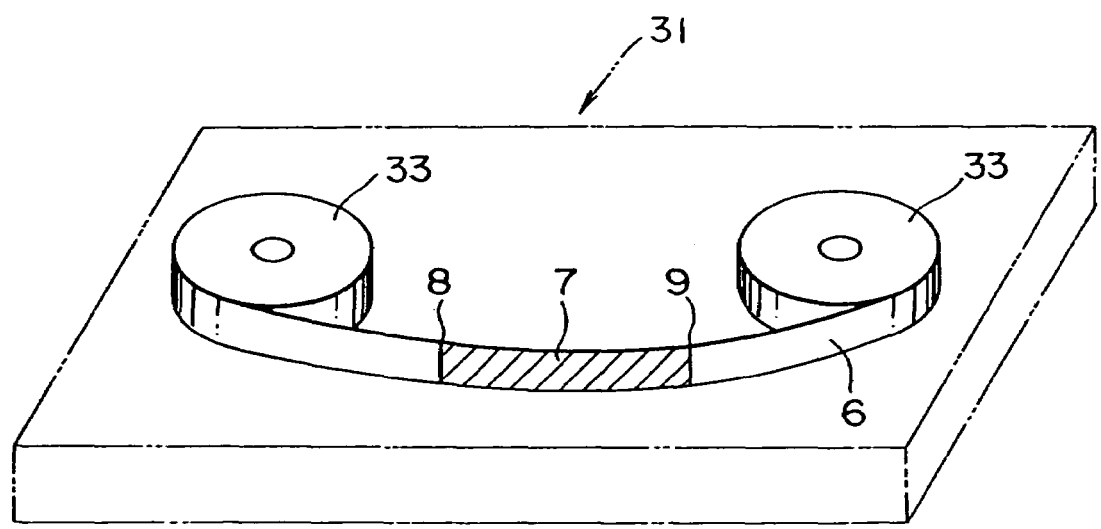

F I G. 16
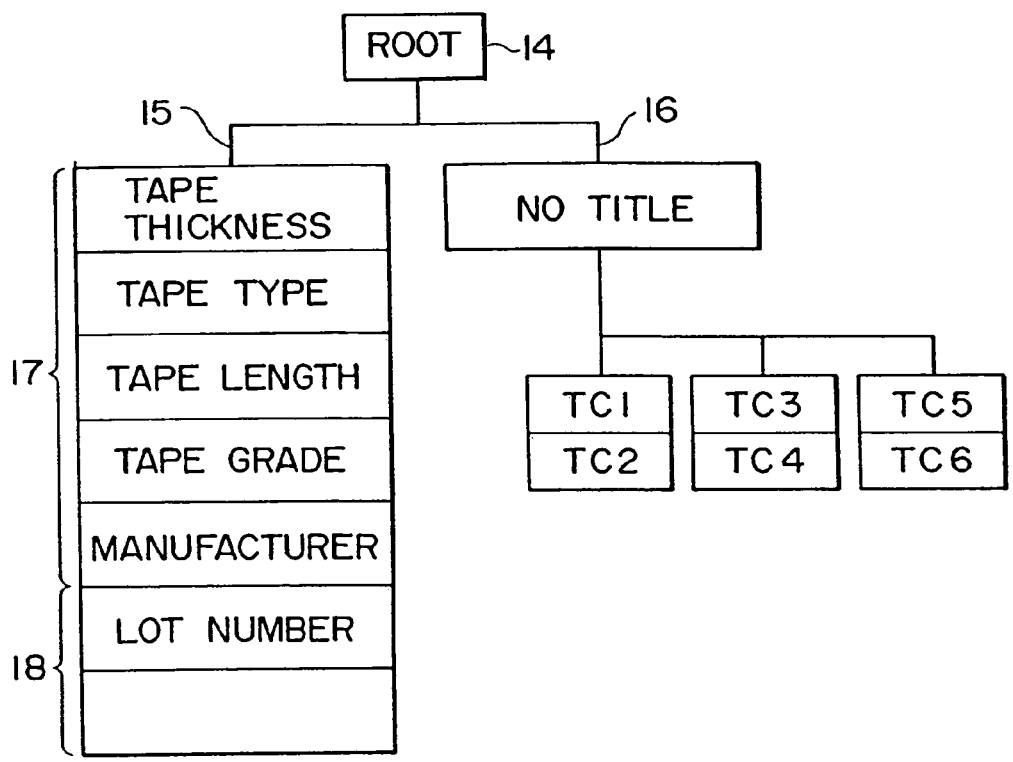
F I G. 17
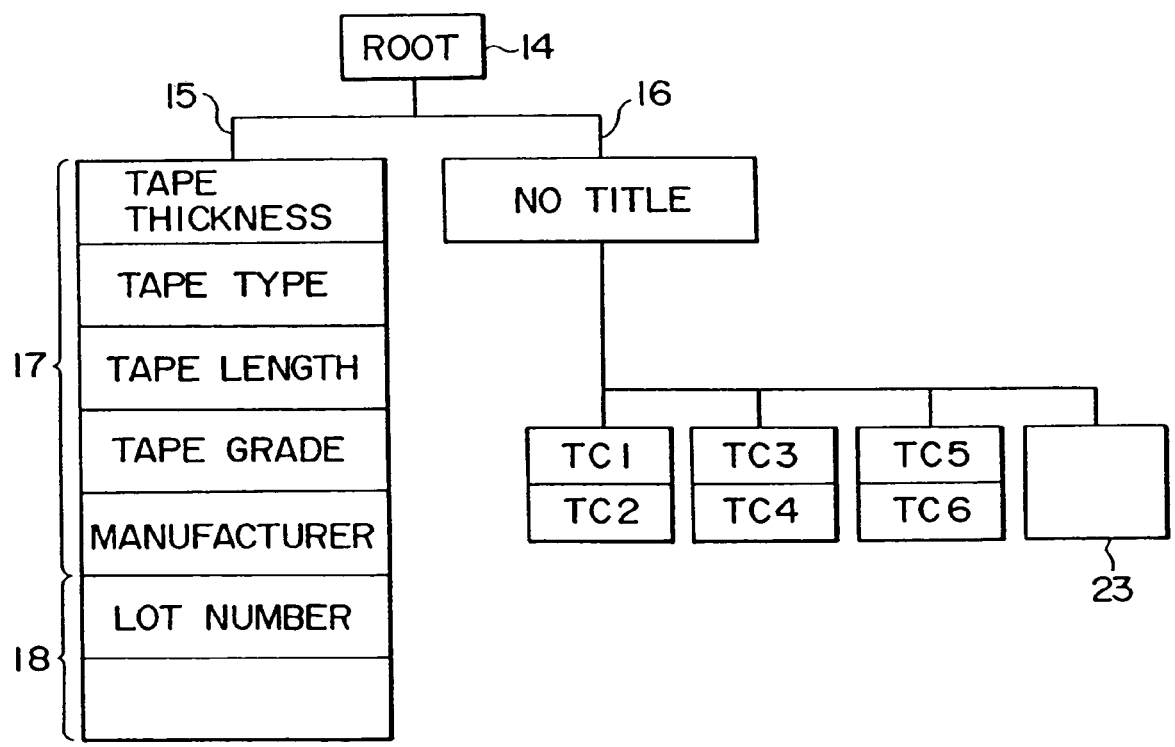

FIG. 26

| | PACK | |
|---|---|---|
| | MSB ... LSB | |
| PC0 | (ITEM) | |
| PC1 | | |
| PC2 | (DATA) | |
| PC3 | | |
| PC4 | | |

FIG. 27

| | MSB ITEM LSB | | LEVEL |
|---|---|---|---|
| | UPPER | LOWER | |
| | 0001 | xxxx | TITLE |
| | 0010 | xxxx | CHAPTER |
| | 0011 | xxxx | PART |
| | 0100 | xxxx | PROGRAM | xxxx : 0000 ～ 1111

FIG. 34

CASSETTE No. : 3  93.6.14 PM 7:31
CASSETTE TITLE : AMUSEMENT

REMAIN TIME 0h21m

| PROGRAM No. | DATE | PROGRAM NAME | TIME | CATEGORY |
|---|---|---|---|---|
| 1. | Jun. | STAR WARS | 1h58m | MOVIE |
| 2. | Jul. | RAMBO | 2h11m | MOVIE |
| 3. | Sep. | MICHAEL JACKSON | 0h30m | MUSIC |

| PROGRAM 1. | PROGRAM 2. | PROGRAM 3. | NO RECORDING |
|---|---|---|---|

SONY VIDEO CASSETTE

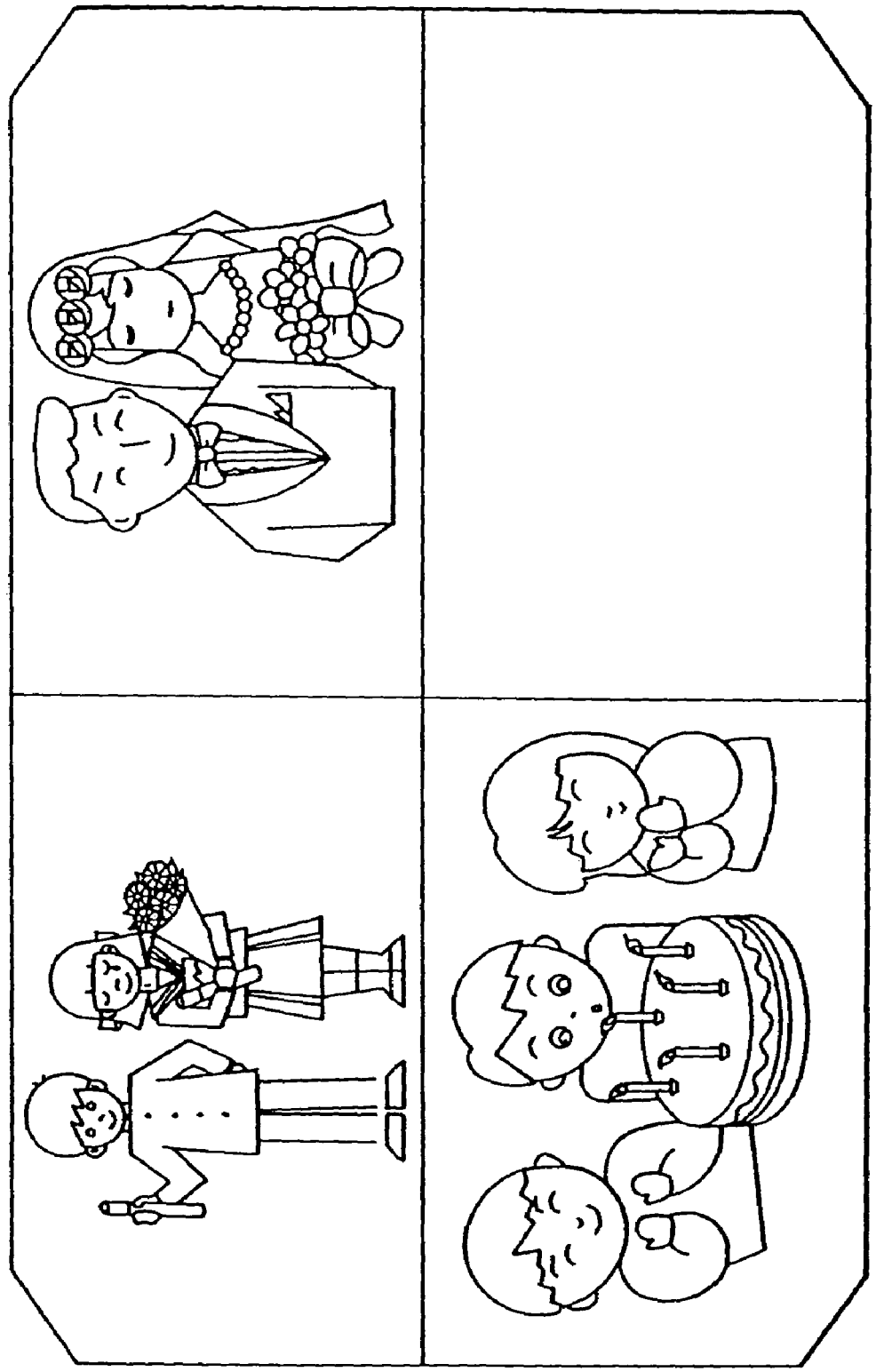

RECORDING MEDIUM CARTRIDGE WITH MEMORY CIRCUIT EMPLOYING A HIERARCHICAL DATA STRUCTURE

This is a continuation of application Ser. No. 09/596,174 filed Jun. 16, 2000 now U.S. Pat. No. 6,922,520, the entirety of which is incorporated herein by reference.

BACKGROUND OF THE INVENTION

This invention relates to a recording medium cartridge of the type which includes a memory for storing information concerning signals recorded on the recording medium, and more particularly is related to a manner of storing information in the memory of such a recording medium cartridge so as to promote higher efficiency in the management and retrieval of the information stored in the memory and of the signals recorded on the recording medium.

In a known type of recording medium cartridge, such as a magnetic tape cassette, information concerning the magnetic tape, such as the thickness, the type, the length, the grade, etc., of the magnetic tape, can be determined on the basis of a plurality of detection holes (hereinafter referred to as "recognition holes") that are provided at a corner of the rear face of the cassette.

However, as the size of cartridges has been reduced, it has become increasingly difficult both to provide locations for the recognition holes and to provide a desired amount of information using the number of recognition holes which are available.

Moreover, in order to determine what materials are recorded on the magnetic tape, it is necessary to advance or rewind the magnetic tape to reach the position on the tape at which the material of interest is recorded. This often requires a significant period of time.

To overcome these problems, it has been proposed to include in a recording medium cartridge a memory, separate from the magnetic tape, for storing information with respect to the cartridge and the materials recorded on the tape. Such a recording medium cartridge is disclosed, for example, in U.S. Pat. Nos. 4,338,644 and 4,383,285.

With a recording medium cartridge of the type just described, having a memory for storing information concerning the materials recorded on the recording medium, it is important that the information stored in the memory accurately reflect the materials recorded on the recording medium and also that the information stored in the memory be managed efficiently. However, the prior art fails to disclose any system for managing the information stored in the memory.

OBJECTS AND SUMMARY OF THE INVENTION

Accordingly, it is an object of the present invention to provide a method of storing information in the memory of a recording medium cartridge using a predetermined technique which facilitates efficient management of the materials recorded on the recording medium.

Another object is to divide the program materials recorded on the recording medium into a number of separate groups corresponding to different categories of programs and to organize the groups in the form of a hierarchic or tree structure to facilitate management of the program materials.

A further object of the invention is to provide a recording medium cartridge having a memory for storing information concerning programs recorded on the recording medium, with the information being stored so as to divide the programs into groups for facilitating classification of the programs and searching for, and reference to, the recorded programs.

In accordance with an aspect of the present invention, a method of storing information representative of signals recorded on a recording medium accommodated within a recording medium cartridge includes the steps of providing a memory device as part of the recording medium cartridge and storing the information in the form of a tree structure that includes at least a plurality of directory entries each having associated therewith a plurality of data items. Each of the data items represents a respective portion of the signals recorded on the recording medium, and contains data indicative of a starting position and a ending position on the recording medium of the respective portion of the signals.

According to another aspect of the invention, at least some of the data items are formed of at least one data packet and each data packet has a fixed length and a predetermined format and includes a level code indicative of a level of the tree structure, the data packet being assigned to that level of the tree structure.

According to a further aspect of the present invention, there is provided a method of retrieving information representative of signals recorded on a recording medium accommodated within a recording medium cartridge, with the information having been stored in the form of a tree structure in a memory device provided as part of the recording medium cartridge and the method including the steps of loading the recording medium cartridge in a recording and reproducing apparatus that is operatively connected to a display device, and displaying at least some of the information on the display device. According to further aspects of the invention the signals recorded on the recording medium include video signals, the display device is a video monitor or a television receiver, the information stored in the memory device includes image data representative of respective portions of the video signals and the displaying step includes displaying a plurality of images simultaneously in split-screen form, with each of the displayed images representing a respective portion of the video signals recorded on the recording medium.

According to yet another aspect of the invention, there is provided a recording medium cartridge which includes a housing, a recording medium accommodated within the housing, a memory device carried by the housing, and terminals associated with at least one outer surface of the housing for providing electrical connections between the memory device and a reproducing apparatus with which the cartridge is to be used. The memory device has stored therein data signals representative of program information recorded on the recording medium. The data signals are stored in the form of a tree structure including at least a plurality of directory entries each having associated therewith a plurality of data items. Each of the data items represents a respective portion of the program information, and contains data indicative of a starting position and an ending position on the recording medium of the respective portion of the program information.

The information storage and retrieval methods and the recording medium cartridge as just described permit efficient management of the stored information relating to the recorded program materials and provide for rapid and convenient access to the recorded program materials.

The above, and other objects, features and advantages of the present invention will be apparent from the following detailed description thereof which is to be read in connection with the accompanying drawings.

BRIEF DESCRIPTION OF THE DRAWINGS

FIGS. 1(a) and 1(b) diagrammatically illustrate a basic data item used in forming a data structure according to the present invention;

FIG. 2 schematically illustrates a portion of a signal that is recorded on magnetic tape and which corresponds to one of the data items of FIG. 1(a) or 1(b);

FIG. 16 diagrammatically illustrates in the form of a tree structure automatic creation of directory entries during signal recording operations in accordance with the present invention;

FIG. 17 diagrammatically illustrates creation of a new directory entry within the tree structure shown in FIG. 16;

FIG. 26 is a table which illustrates the format of a data packet used for storing information in the memory of a recording medium cartridge in accordance with the present invention;

FIG. 27 is a table which shows codes to be used in the data packet of FIG. 26 for identifying a level to which the data packet is assigned in a tree structure;

FIG. 34 illustrates a screen display of information stored in the recording medium cartridge memory; and FIG. 35 shows a split-screen display containing multiple images reproduced from image data stored in the recording medium cartridge memory and representing respective recorded program segments.

DETAILED DESCRIPTION OF THE PREFERRED EMBODIMENTS

Figure 28:
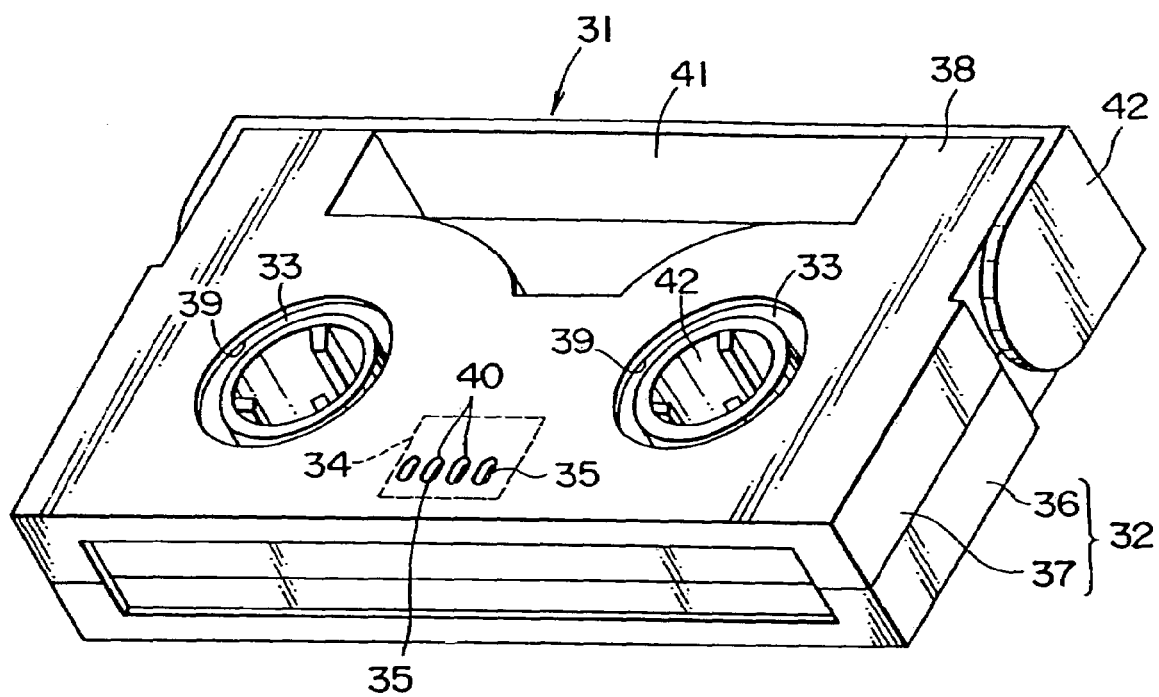
FIG. 28 is a perspective view of a recording medium cartridge provided with a memory device in accordance with the present invention.

Referring initially to FIG. 28, a recording medium cartridge 31, in accordance with an embodiment of the invention, includes a case 32 that is formed in the shape of a flat, rectangular box by joining together a top half case 36 and a bottom half case 37. The recording medium cartridge 31 also includes a pair of tape reels 33 disposed within the case 32, and an IC plate 34 carried within the case 32 and provided with terminals 35 accessible from outside of the case 32.

The case 32 includes a bottom wall 38 having formed therein holes 39 for providing access to the tape reels 33 and terminal slots 40 for providing access to the terminals 35 of the IC plate 34. The bottom wall 38 also includes a recess 41 across which a magnetic tape (not shown) is extended. It will be understood that the magnetic tape, which is not shown, is wound in a conventional manner on the tape reels 33. The cartridge 31 also includes a lid 42 which is displaceable in a conventional manner between a closed position which protects the tape and covers a front opening of the case 32 and an open position which exposes the magnetic tape.

Figure 29:
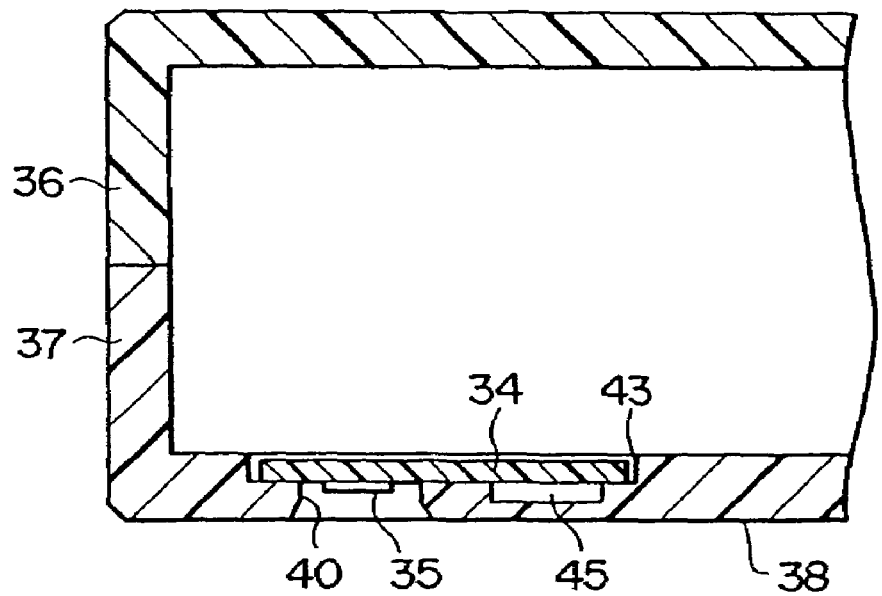
FIG. 29 is a cross-sectional view of a portion of the recording medium cartridge of FIG. 28.
Figure 30:
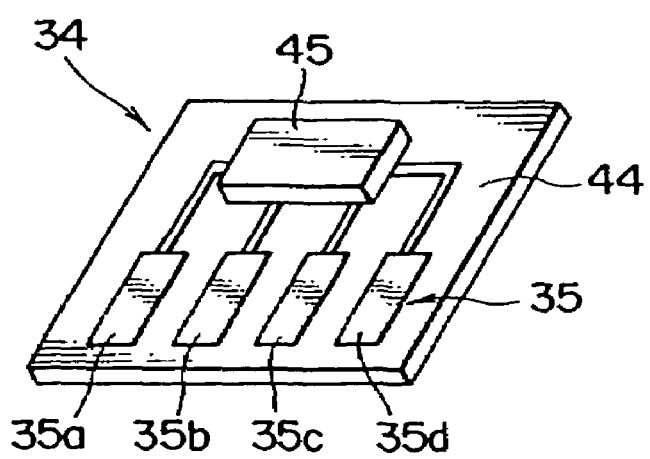
FIG. 30 is a semi-schematic perspective view of a printed wiring board embodying the memory device incorporated in the recording medium cartridge of FIG. 28.

Referring now to FIGS. 29 and 30, the IC plate 34 includes a printed wiring board 44 having terminals 35 formed thereon. An IC chip 45, i.e., a semiconductor memory device, is mounted on the printed wiring board 44. The IC plate 34 is retained in a shallow, substantially rectangular recess 43 that is formed in the inner surface of the bottom wall 38 of the case 32 at the middle of a rear portion of the bottom wall 38. The four terminal slots 40 are arranged laterally in the recess 43. The IC plate 34 and recess 43 are dimensioned so that the IC plate 34 fits snugly in the recess 43.

The terminals 35 are rectangular and are elongated in the widthwise direction of the case 32. The terminals 35 extend in parallel and are arranged in a sequence in the lengthwise direction of the case 32 in positions corresponding to respective terminal slots 40. The terminals 35 are preferably gold-plated to provide lasting and reliable electrical contacts.

A circuit pattern formed on the printed wiring board 44 connects the terminals 35 with the IC chip 45. The terminals 35 include, for example, a power supply terminal 35*a*, a data input/output terminal 35*b*, a clock terminal 35*c*, and a ground terminal 35*d*. The IC plate 34 is secured within the recess 43 of the bottom wall 38 by welding, an adhesive or the like, and is positioned with the IC chip 45 facing downwardly with respect to the case 32 and the terminals 35 presented for access via respective terminal slots 40.

Figure 31:
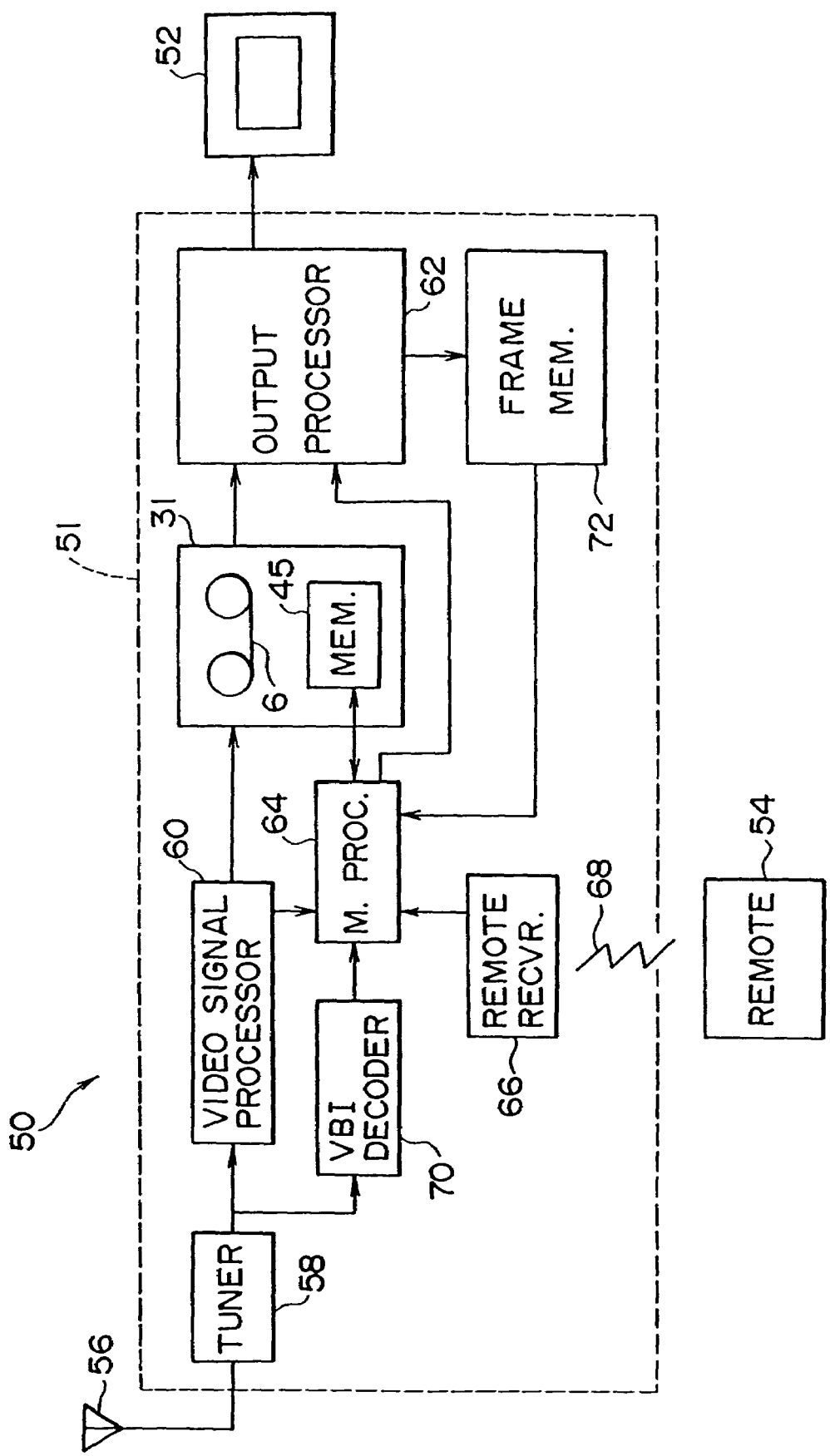
FIG. 31 is a simplified block diagram illustrating a system in which the recording medium cartridge of FIG. 28 may be used.

FIG. 31 schematically illustrates a video system 50 in which the recording medium cartridge 31 (in this case a video tape cassette) may be used. The video system 50 includes a video tape recorder (VTR) 51 in which the tape cassette 31 is inserted and which is connected to a television receiver 52 for display of video signals reproduced from the cassette 31. A remote control unit 54 is provided for a user to enter control commands for the VTR 51, and an antenna 56 is provided as a signal source for the VTR 51.

Video signals received via antenna 56 are supplied to a tuner 58 and a tuned signal output from the tuner 58 is processed by a video signal processor 60 for recording on a magnetic tape 6 accommodated within tape cassette 31.

The VTR 51 also includes an output processor 62 which processes video signals reproduced from the tape 6 of tape cassette 31 and outputs the processed signals for display by the TV receiver 52. Although not explicitly shown in the simplified block diagram of FIG. 31, it should be understood that the VTR 51 includes a rotary magnetic recording head and associated circuitry for recording on the magnetic tape 6 the signal provided by video signal processor 60 and for reproducing from the magnetic tape 6 a signal to be processed by output processor 62.

The IC memory chip 45 carried in tape cassette 31 is connected for data communication, via at least one of the terminals 35 (FIGS. 28-30), with a microprocessor 64 provided within VTR 51 (FIG. 31). The microprocessor 64 may, for example, be the primary control circuit for controlling all the operations of VTR 51. Accordingly, microprocessor 64 is connected for receiving command signals from the remote control unit 54 by way of remote receiving circuitry 66 which is in communication with the remote control unit 54 via a wireless signal path 68. It will be understood that the microprocessor 64 has associated therewith conventional circuits such as program memory and working memory, which are not separately shown.

The VTR 51 also includes a VBI decoder 70 which separates vertical blanking interval code signals from the tuned video signal provided by tuner 58 and provides decoded signals to the microprocessor 64. VTR 51 also includes a frame memory 72 which stores one or more frames of reproduced video signals output from output processor 62 and provides the signals, in the form of digital data, to the microprocessor 64.

The microprocessor 64 is also preferably employed for controlling advancing or rewinding of the magnetic tape 6 by means of a tape transport mechanism that is not shown in FIG. 31. The microprocessor 64 accordingly has access to data indicative of the position of tape 6 relative to the winding or unwinding thereof within cassette 31.

The manner of storing data in the memory 45 of the video tape cassette 31 will now be described. Referring initially to FIGS. 1(*a*) and 1(*b*), a basic data item 1 represents a minimum unit of data stored in the memory 45 for the purpose of keeping track of video signals recorded on the tape 6 of tape cassette 31. As shown in FIG. 1(*a*), the data item 1 includes a time code 2 which represents a starting point of a recorded video signal portion and a time code 3 which represents the end point of the video signal portion. Alternatively, the basic data item may take the form of the data item 1' (FIG. 1(*b*)), in which the starting point of the signal portion is represented by a track number 2' and the ending point is represented by a track number 3'. In the following description, it will be assumed that the data item 1, including time codes, is used, rather then the data item 1', which includes track numbers.

The data item 1 corresponds, as shown in FIG. 2, to a video signal that is recorded at a particular section 7 of a magnetic tape 6 wound around reels 33 of the video tape cassette 31. The recorded area 7 is defined by a starting point 8 which corresponds to the time code 2 of the data item 1 and by an ending point 9 which corresponds to the time code 3 of the data item 1. The length of the recorded area 7 is arbitrary, and may be fixed as the area corresponding to one frame or may be of variable length corresponding, for example, to a recorded program.

Figure 3:
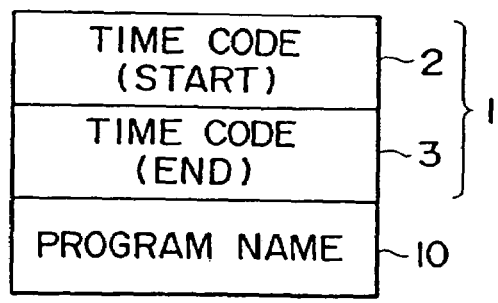
FIG. 3 diagrammatically illustrates an extended data item in which additional information has been added to the basic data item of FIG. 1(a) or 1(b)

The basic data item 1 can be extended by addition of data of various types. For example, and as shown in FIG. 3, text data representing a program name 10 can be added to the data item so that the data item includes the program name data 10 in addition to the starting time code 2 and the ending time code 3. It will be appreciated that the program name 10 may be, for example, the title of a movie recorded in the tape area defined by the starting and ending time codes.

Figure 4:
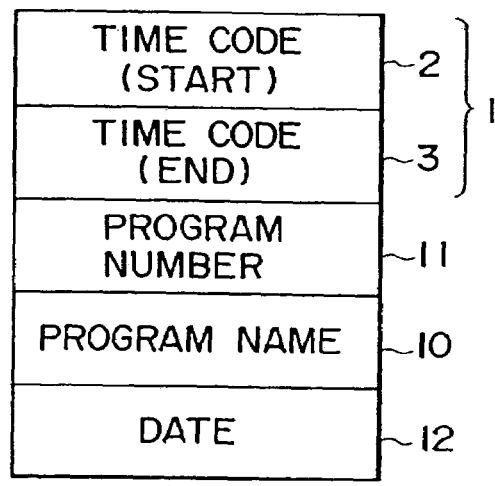
FIG. 4 diagrammatically illustrates another extended data item with further information added to the data item of FIG. 3.

Further, as shown in FIG. 4, the data added to the data item 1 may include, in addition to the program name 10, a program number 11 and a date of recording 12. For example, the program number 11 may be "program 1", the program name 10 may be "overseas tour" and the date may be "May 5, 1992".

Figure 5:
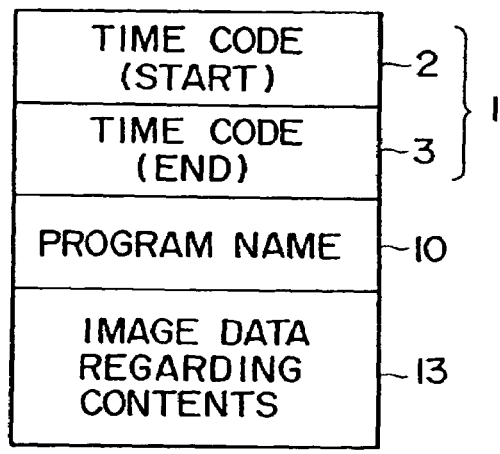
FIG. 5 diagrammatically illustrates still another extended data item formed by adding image data to a basic data item.

In each of the examples described with respect to FIGS. 3 and 4, the additional information has been in the form of text information. Alternatively, however, the additional information may take the form of image data 13 (as shown in FIG. 5) which represents an image indicative of the contents of the video signal recorded in the tape area defined by the time codes 2 and 3. In the particular example shown in FIG. 5, it will be noted that the additional information includes both image data 13 and a program name 10. Thus, it will be seen that mixed types of data may be included in the additional information added to the basic data item 1. The types of data may include text data, image data, audio data, executable software files, codes indicative of copyright protection, and so forth.

There will now be described a data structure based upon the fundamental data items as shown in FIG. 1 and used for storing the data in the memory 45 of tape cassette 31. It will be understood that if a number of recording operations are performed using the tape cassette 31 so that a number of video signal portions are formed in respective areas of tape 6, then a corresponding number of basic data items 1 will be accumulated in the memory 45.

Figure 6:
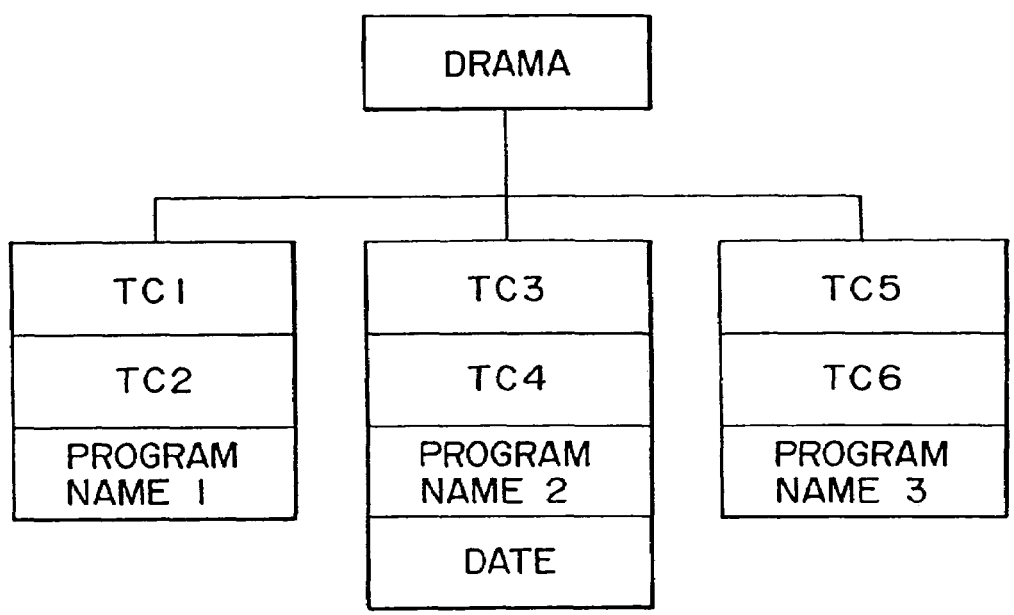
FIG. 6 diagrammatically illustrates a tree structure formed using basic data items.

For example, as shown in FIG. 6, if three programs have been recorded on the tape, there are three data items present in the memory 45, each corresponding to a respective one of the three programs. A first one of the three data items includes a time code TC1 representing a starting point, and a time code TC2 representing an ending point, of the first program as well as a first program name corresponding to the first program. With respect to the second program, there is a second data item including a starting time code TC3, an ending time code TC4, a second program name and a recording date. Similarly, with respect to a third program, there is a third data item including a starting time code TC5, an ending time code TC6, and a third program name.

Figure 7:
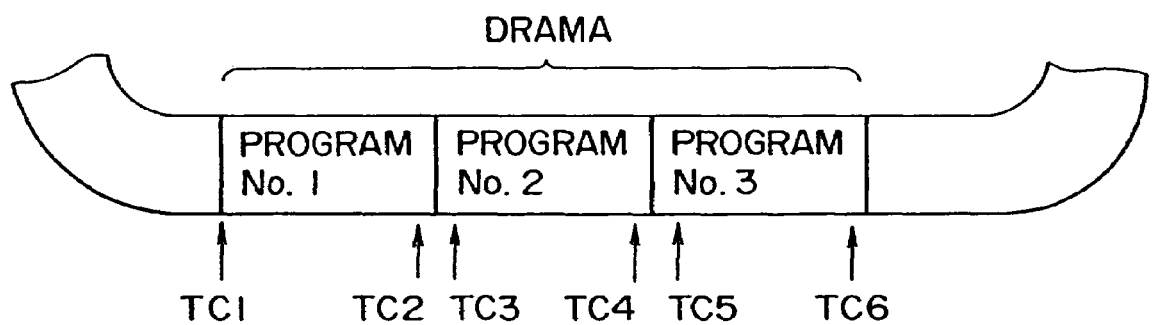
FIG. 7 schematically illustrates signals recorded on a magnetic tape and corresponding to the tree structure of FIG. 6.

The corresponding tape areas having the respective programs recorded thereon are schematically shown in FIG. 7, with the area in which the first program is recorded being defined by time codes TC1 and TC2, the area in which the second program is recorded being defined by time codes TC3 and TC4 and the area in which the third program is recorded being defined by time codes TC5 and TC6.

It should be understood that each of these areas may represent either a recorded portion or a blank portion of the tape. Of course, when the respective area is blank, the corresponding data item includes only the starting and ending time codes, and does not include additional information such as a program name or a recording date.

As illustrated in FIGS. 6 and 7, the three programs may be formed into a group under a descriptive name such as "drama" which may be applied to the group. In particular, a hierarchic or tree data structure is formed in which the three data items corresponding to the three programs are associated with the group name "drama". The data entry including the group name is formed at a higher level of the tree structure than the level at which the three program data items are formed, all of the three program data items being at a common level. This structure may be implemented by creating a new folder in the memory 45 with the data items corresponding to the three programs being processed so as to belong to the new folder.

There will now be discussed, with reference to FIG. 8, the types of data structure levels to be used in a tree or hierarchy for either the pre-recorded tape (such as a movie or a music recording), or for a user tape (that is, a tape on which a purchaser of the tape has performed the recording).

Figure 8:
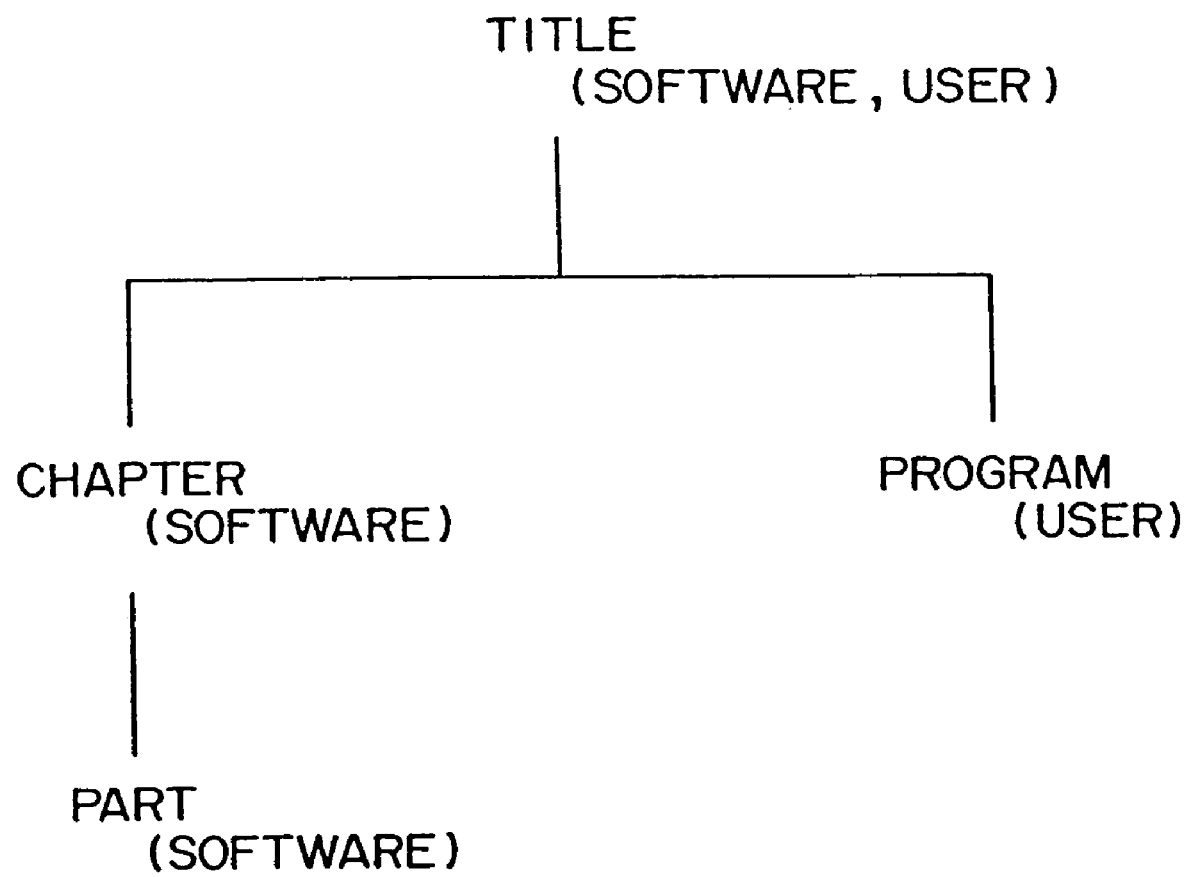
FIG. 8 schematically illustrates tree structure levels characteristic of pre-recorded tapes and user tapes.

Turning, then, to FIG. 8, it will be noted that three types of levels are included in the tree structure for a pre-recorded tape, namely a title level, a chapter level, and a part level. The chapter level is for gathering a plurality of parts into a group under one of the chapters and the title level is for gathering a plurality of chapters together as a group in association with the title.

On the other hand, for a user tape two levels are provided, a title level and a program level. The title level is for gathering together in a group a plurality of programs to be associated with the title. The numbers of levels shown in FIG. 8 are by way of example only, and the number of levels can be increased if necessary.

Figure 9:
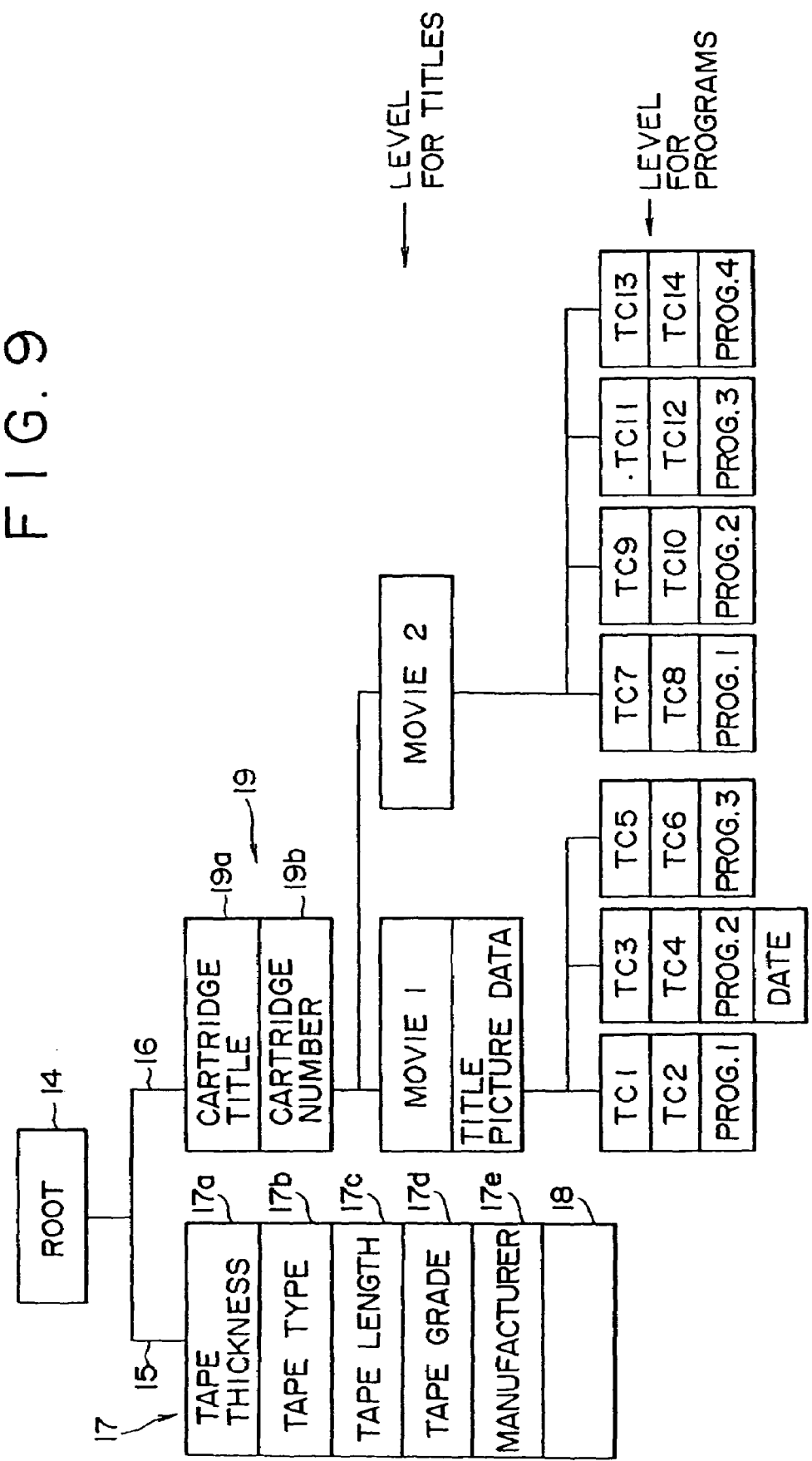
FIG. 9 diagrammatically illustrates a complete tree structure formed using basic data items.

FIG. 9 shows an example of a tree structure for data corresponding to video signals recorded by a user on the tape cassette 31. As seen in FIG. 9, the data stored in the memory 45 proceeds from a root 14 into two divisions or branches, which are a recording medium information branch 15 and a recorded content information branch 16, the latter representing information concerning the signals that have been recorded on the tape.

The recording medium information branch 15 includes identification information 17 with respect to the recording medium cartridge itself as well as miscellaneous additional data 18. The identification information 17 may include, for example, tape thickness information 17a, tape type information 17b, tape length information 17c, tape grade information 17d and a code 17e for identifying the manufacturer. The miscellaneous additional data 18 may include such information as date of manufacture, lot number, etc.

The recording content information is stored in the form of a tree structure, of which the highest level 19 includes cartridge title information 19a and cartridge number information 19b. The data items for implementing the highest level 19 of the branch 16 are, like the branch 15, present in the memory 45 of each cartridge. It will be understood that information which relates to the entire recording medium cartridge is stored in the recording medium information branch 15 and in the highest level 19 of the recorded content information branch 16. Moreover, the information stored in the recording medium information branch 15 is fixed, whereas the information stored in the highest level 19 of the other branch 16 is variable information and can be changed by a user.

Beneath the highest level 19 of the branch 16 there is provided a hierarchic structure for the rest of the branch 16, including title and program information. In particular, title level entries corresponding to a "MOVIE 1 " and a "MOVIE 2" are present. Program level entries for programs 1-3 are associated with the entry for "MOVIE 1" at a program level that is below the title level, and program level entries for programs 1 through 4 are associated with the title level entry for "MOVIE 2".

Figure 10:
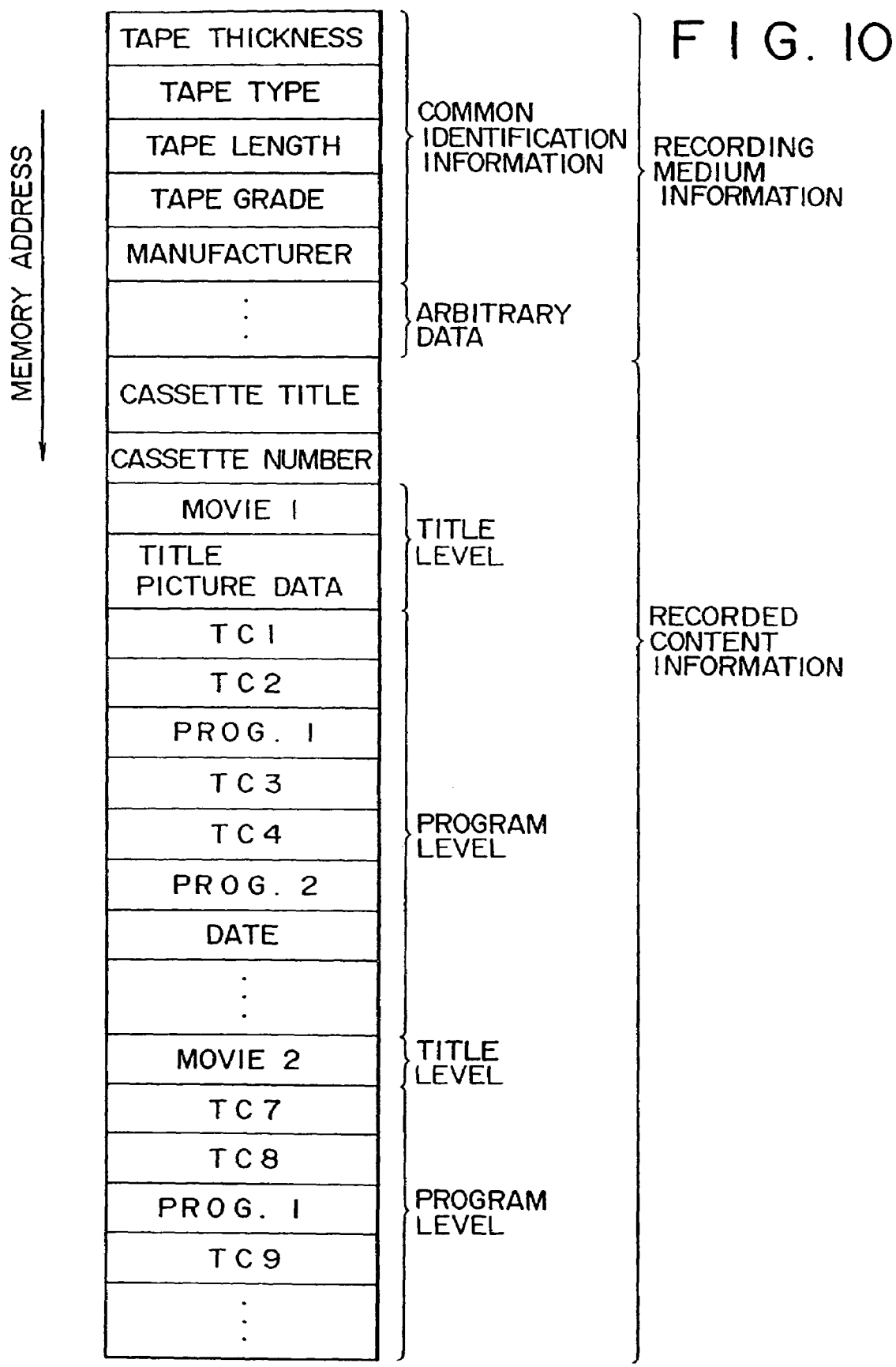
FIG. 10 diagrammatically illustrates a sequence of memory locations in which are stored data items corresponding to the tree structure of FIG. 9.

FIG. 10 indicates the sequence in which the information illustrated in FIG. 9 is stored in the memory of the recording medium cartridge. The sequence shown in FIG. 10 starts from the lowest-numbered address location and proceeds to higher-numbered addresses. The recording medium information is stored at the beginning of the sequence, followed by the information relating to the signals recorded on the tape.

More specifically, the common identification information (corresponding to branch 15 of FIG. 9), including data relating to the recording medium and data identifying the manufacturer, etc., is stored first, followed by other miscellaneous information. Next is the cassette identifying information, such as number and title, and after that the hierarchically arranged data is stored, with each item of title level information being followed with the lower level (program level) entries associated with the title level entry. That is, the title level entry for "MOVIE 1" is followed by the three program entries associated with "MOVIE 1". Then the title level entry for "MOVIE 2" is stored, followed by the four program level entries associated with "MOVIE 2".

Although FIG. 10 illustrates the data arrangement corresponding to a user tape directory as shown in FIG. 9, it will be understood that a similar hierarchic data arrangement is used in storing directory data for a pre-recorded tape.

Figure 11:
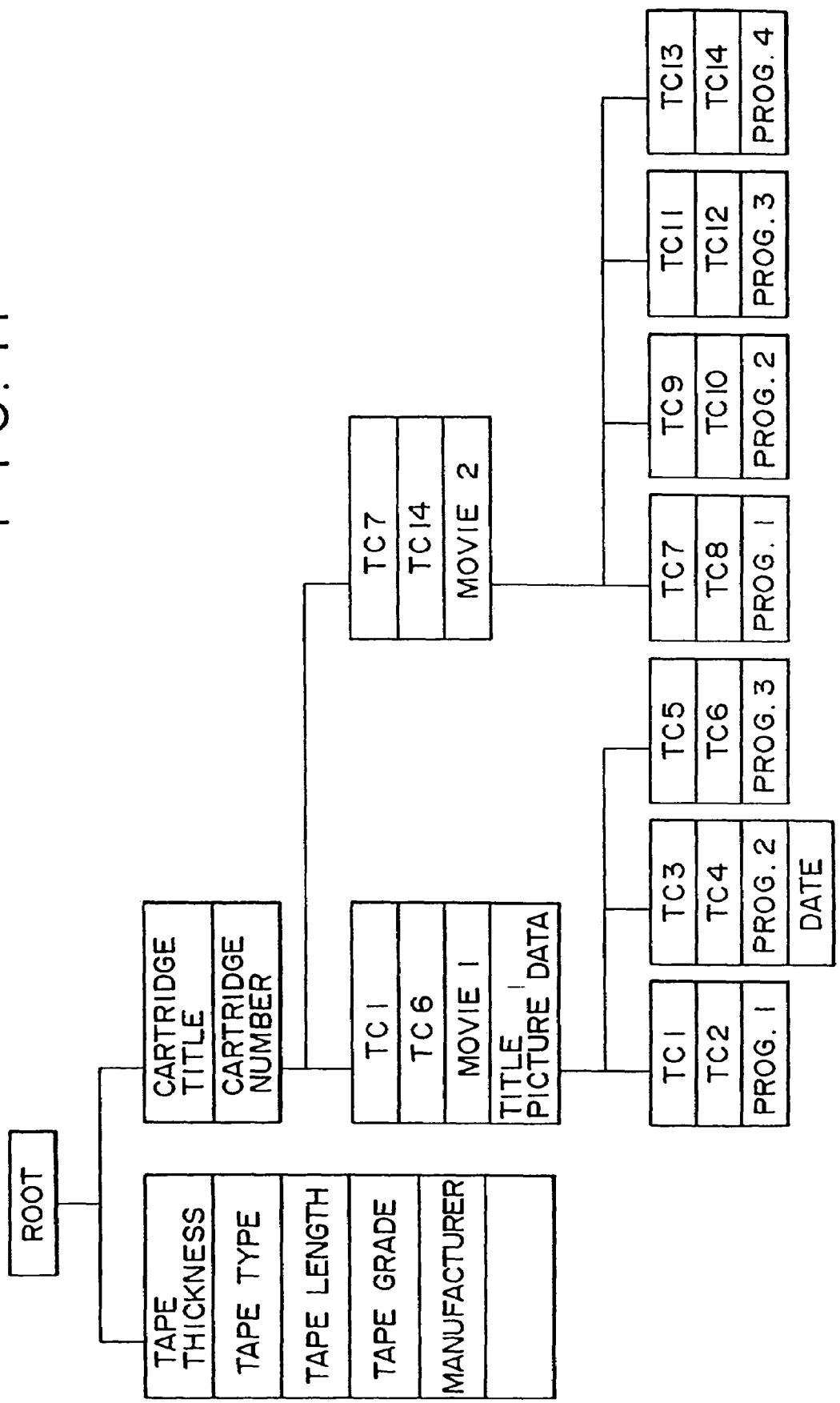
FIG. 11 diagrammatically illustrates another tree structure formed using basic data items.

FIG. 11 shows another hierarchic directory data structure for a user tape. The structure shown in FIG. 11 differs from that of FIG. 9 in that it has, as part of the title level entry, a starting point time code and an ending point time code for all of the program materials associated with the title level entry. In other words, the title level entry for "MOVIE 1" includes the starting point time code TC1 representing the starting point on the tape of the first program associated with "MOVIE 1" and also the time code TC6 representing the ending point of the third and last program associated with "MOVIE 1". Similarly, the title level entry for "MOVIE 2" includes a starting point time code TC7 and an ending point time code TC14, which respectively represent the starting point of the first program, and the ending point of the fourth and last program, associated with the title level entry "MOVIE 2".

Figure 12:
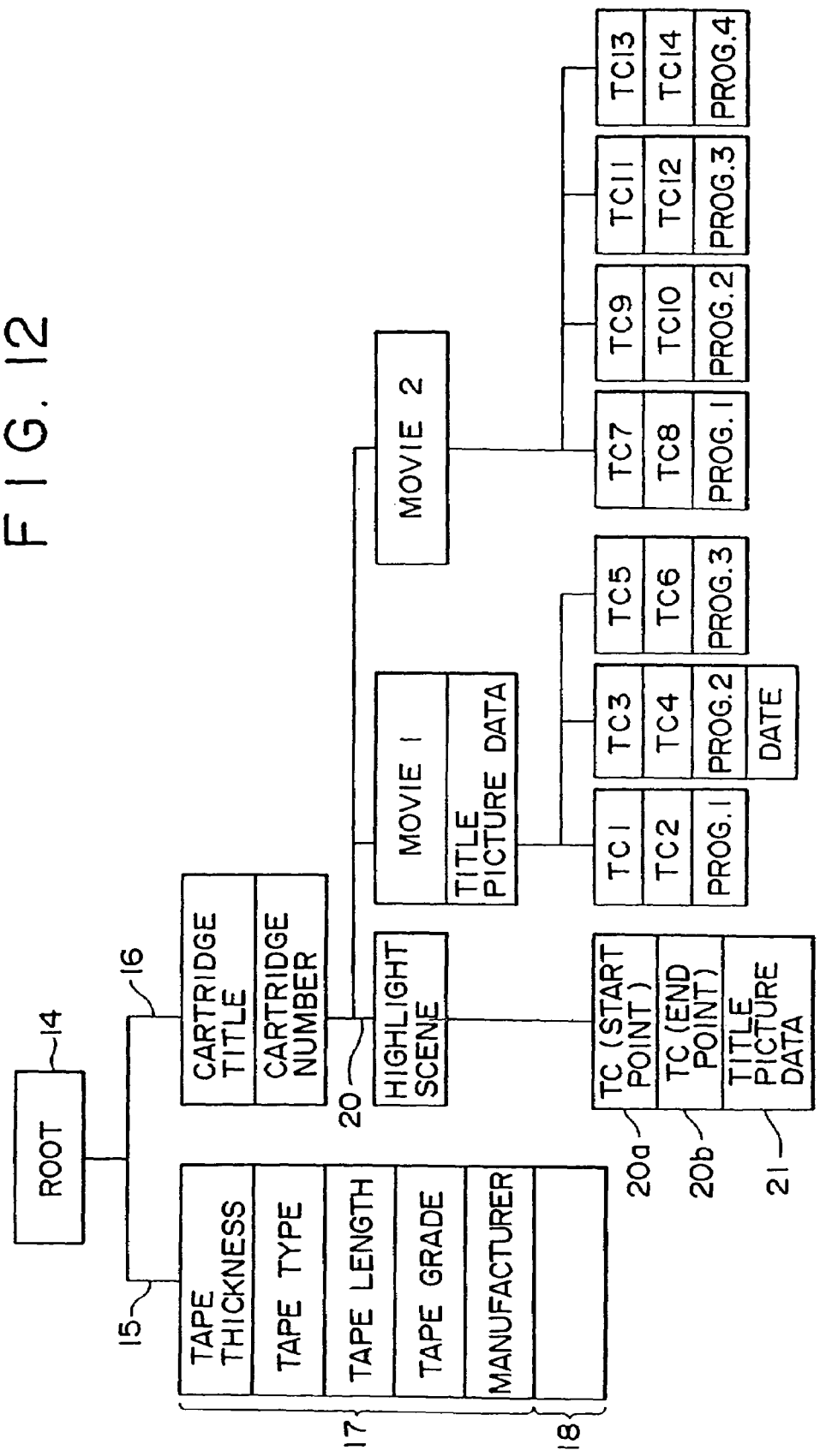
FIG. 12 diagrammatically illustrates a tree structure which includes a directory entry corresponding to a highlight scene.

In the directories illustrated by FIGS. 9-11, the data simply corresponds to the recorded materials and their respective recording locations on the recording medium. However, the directory structure also permits the user to create additional directory entries to provide special indexing or other functions. For example, the user may provide a "HIGHLIGHT SCENE" entry corresponding to a particular portion of the recorded materials which are of special interest to the user or which are desired to be readily available for reproduction. Specifically, as shown in FIG. 12, a title level entry 20 has been given the name "HIGHLIGHT SCENE" and has associated therewith a starting point 20a and an ending point 20b which define the starting and ending points of the scene which is of special interest to the user. Also associated with the "HIGHLIGHT SCENE" entry is additional information designated by reference numeral 2-1 and which is image data representing a frame out of the recorded material in the area defined by the starting point 20a and ending point 20b. This frame may be displayed as an index or title picture to identify the directory entry 20. Alternatively, or in addition to the title picture data, other information, such as a scene number of the like, can be included in the program level entry associated with the title level entry "HIGHLIGHT SCENE".

In selecting and carrying out a procedure in which a "highlight scene" directory entry is created, the user may be guided, for example, by a series of menus and submenus displayed on the screen of TV receiver 52 (FIG. 31). The character information for the menus and submenus may be generated by the microprocessor 64 and output via output processor 62. The menu may include an item such as "CREATE HIGHLIGHT SCENE FILE". When this item is selected by, for example, suitable operation of remote control unit 54, submenu items and/or prompt messages such as "SELECT STARTING POINT OF HIGHLIGHT SCENE FILE", "SELECT ENDING POINT OF HIGHLIGHT SCENE FILE", "ENTER NAME OF HIGHLIGHT SCENE FILE", "CANCEL HIGHLIGHT SCENE FILE", may be displayed by the TV receiver 52 from character information generated by the microprocessor 64. It will be appreciated that the menu items/prompts may appear superimposed over images reproduced from the recording medium. Again, selection of menu items and indication of starting and ending points of the highlight scene program segment may be indicated by operation of the remote control unit 54.

Figure 13:
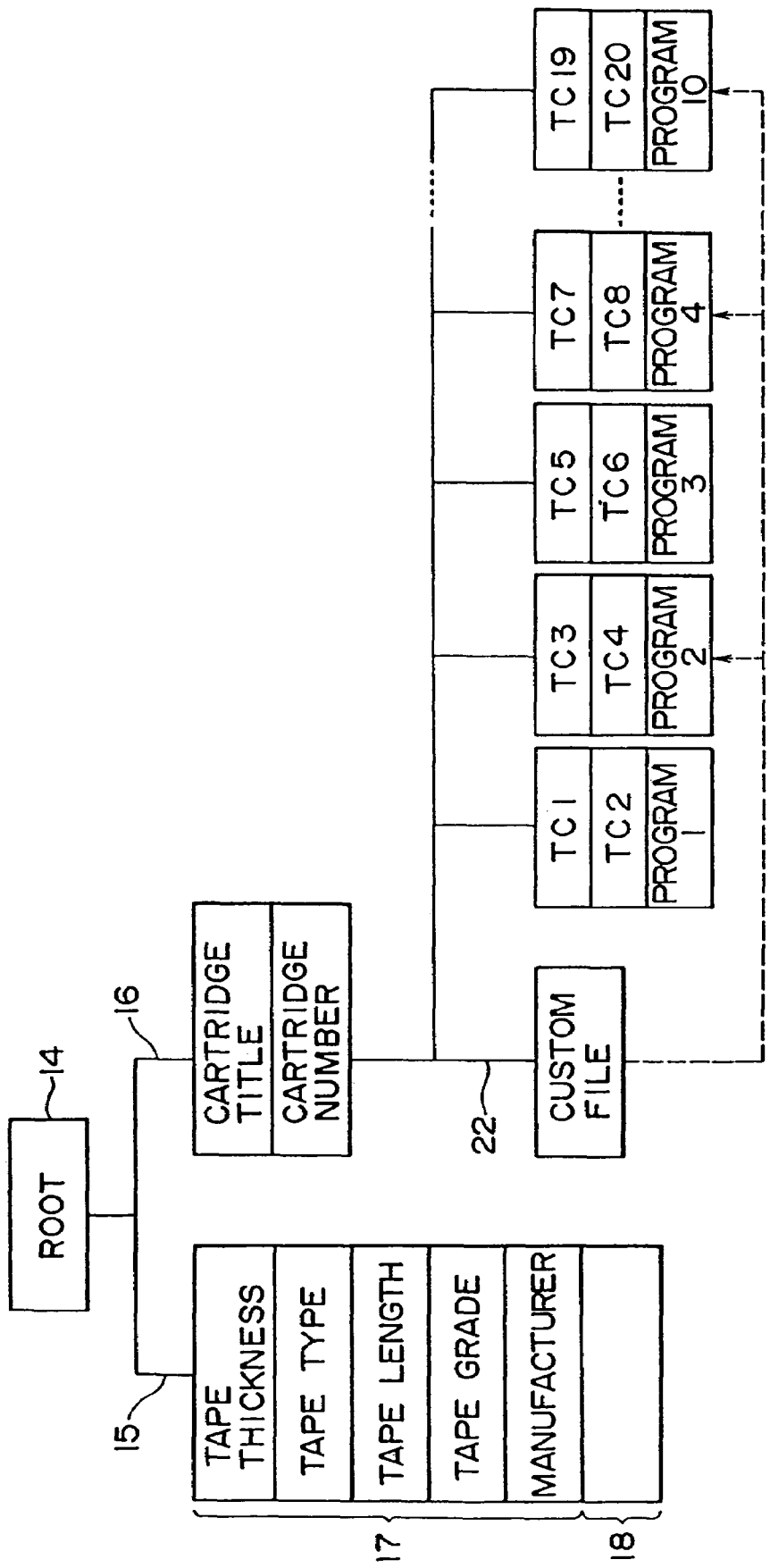
FIG. 13 diagrammatically illustrates a tree structure including a directory entry which corresponds to a custom file.

As another example, and as illustrated in FIG. 13, the user can create a "custom file" selected from previously recorded programs. In particular, for the purposes of the example shown in FIG. 13 it is assumed that ten programs have previously been recorded and that the user desires to have certain of these programs reproduced in an order different from the order in which the programs are recorded. The directory entry 22 can be created for the purpose of selecting the programs and the order of reproduction. For example, the directory entry 22 can include data which will cause program number 2 to be reproduced first, followed by program number 10 and then program number 4. After creating this custom file 22, if the user then selects the custom file to control reproduction, then the reproduction of program materials will occur with program 2 reproduced first, then program 10, then program 4.

As was the case in creation of the highlight scene file, creation of the custom file may be guided by menus and/or prompts and carried out in response to command signals generated using the remote control unit 54. It will be understood that a graphical user interface may also be employed, in which the tree structure of FIG. 13 is displayed by TV receiver 52, together with pull-down menus or the like. In this case, the remote control unit 54 may include a track ball or the like, instead of or in addition to arrow keys, for the purpose of positioning a cursor for selecting menu items, or for selecting graphically represented files for manipulation.

There will now be described, with reference to FIGS. 14-22, a sequence of operations in which materials are recorded on a blank recording medium cartridge while corresponding directory information is stored in the memory carried in the recording medium cartridge.

Figure 14:
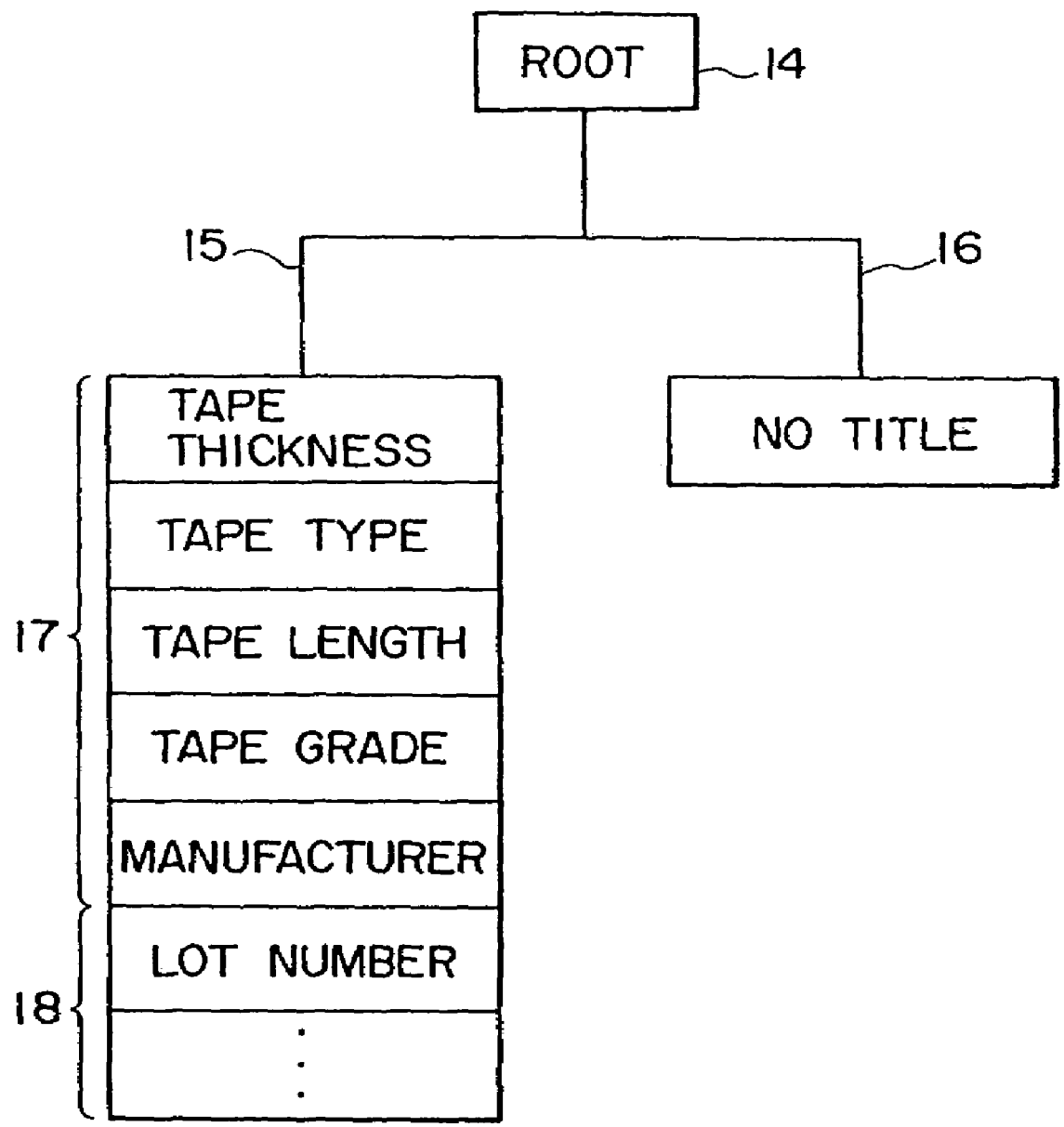
FIG. 14 diagrammatically illustrates a hierarchic data structure corresponding to a blank cartridge.

First, referring to FIG. 14, there is shown a diagrammatic representation of the directory for a blank cartridge. As before, a recording medium information branch 15 and a recorded content information branch 16 appear under a root item 14. (Although root item 14 is shown for conceptual purposes in FIG. 14, it should be understood that in terms of the actual information stored in the recording medium cartridge memory, the root item 14 may be a "phantom" or nonexistent item.)

All of the data making up the recording medium information branch 15 is present in the recording medium cartridge memory, including the common identification information 17 and the miscellaneous additional data 18, as previously described, for example, with respect to FIG. 9. However, at this point, since the cartridge is blank, the recorded content information branch 16 consists only of a dummy title level entry in which no identifying information has been recorded.

Figure 15:
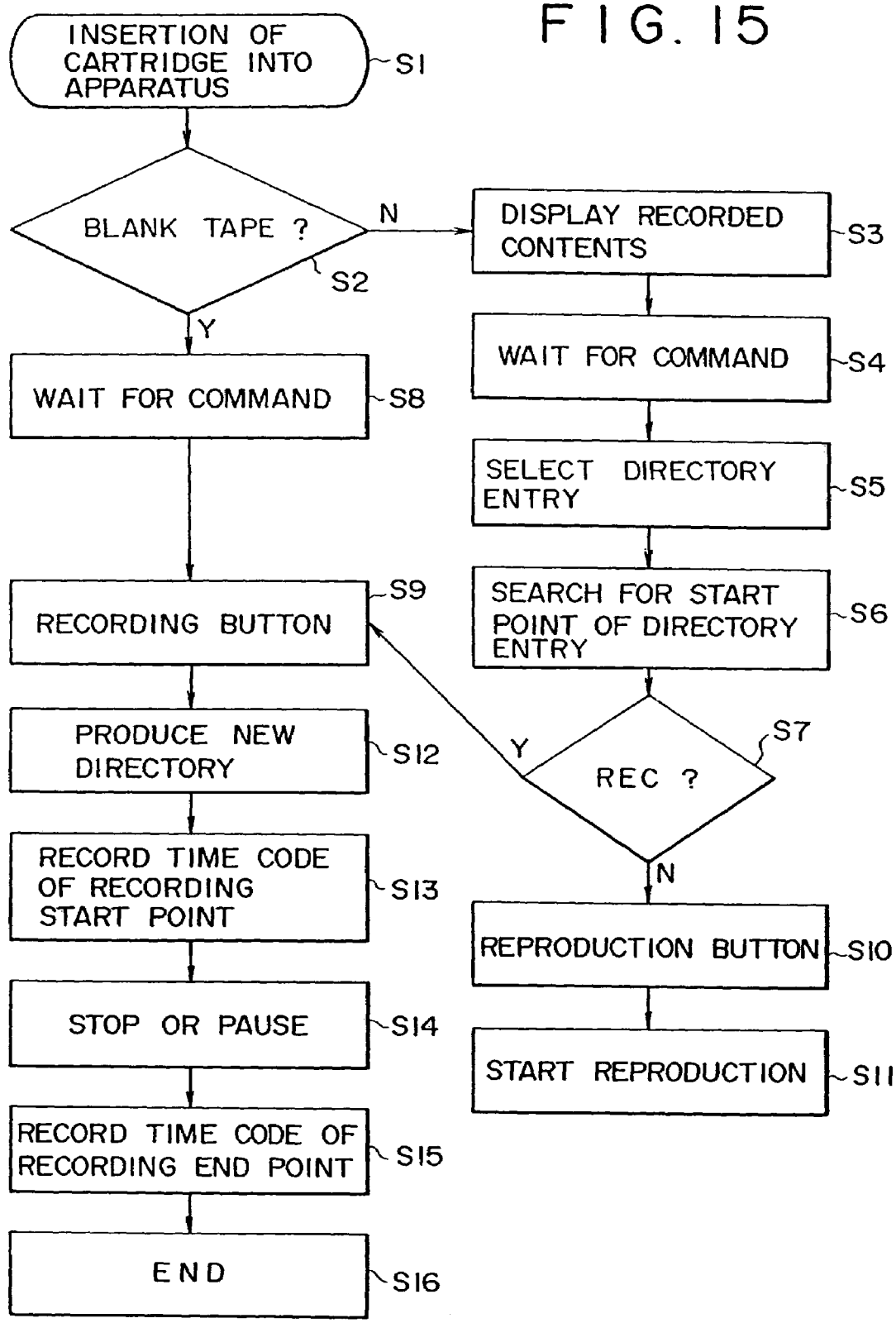
FIG. 15 is a flow chart which illustrates a procedure for managing information with respect to either a blank or a recorded cartridge.

FIG. 15 illustrates in the form of a flow chart a procedure in which program information is recorded on, and reproduced from, the recording medium of the cartridge, with corresponding storage of information in the memory and reference to previously stored information.

The procedure illustrated in FIG. 15 starts with step S1 in which the cartridge is inserted into a recording and reproducing apparatus (such as the video tape recorder 51 of FIG. 31). Then at step S2, it is determined whether the cartridge is a blank cartridge or whether materials have previously been recorded in the cartridge.

If the cartridge is not blank, then step S3 follows at which information relating to the recorded contents is displayed (for example, on TV receiver 52 of FIG. 31). The procedure then continues by awaiting a command (step S4), which is followed, in a typical case, with the selection of a directory entry (step S5) by means of remote control unit 54 (FIG. 31) or the like.

After a directory entry is selected at step S5, step S6 follows, at which the apparatus advances or rewinds the tape in order to locate the starting point of the program segment associated with the directory entry.

The following step is step S7, at which it is determined whether or not to proceed with a recording operation. If not, step S10 may follow, with actuation of a reproduction button, followed by reproduction (step S11) of the program materials corresponding to the directory entry selected at step S6.

Returning to step S2, if it is determined that the tape is blank, the routine again awaits entry of a command (step S8). Actuation of a recording button may follow (step S9), which is also the step which may follow step S7 if it was determined at step S7 to proceed with a recording operation. In either case, upon the commencement of recording in response to step S9, a new directory entry is created (step S12) and the time code representing the point on the tape at which recording has begun is included in the entry (step S13). Recording then continues until a stop or pause is directed by the user (step S14) and at that point a time code representative of the stopping point on the tape is added to the new directory entry (step S15). The routine then ends (step S16).

Figure 18:
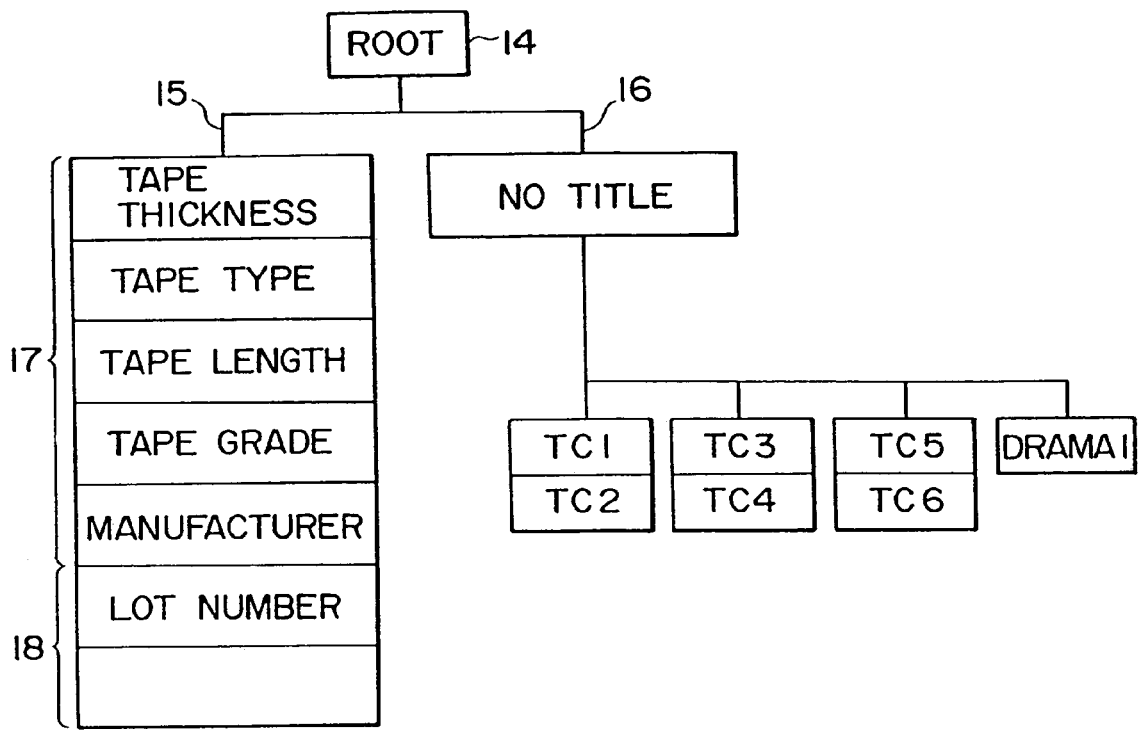
FIG. 18 diagrammatically illustrates application of a title to the new directory entry of FIG. 17.
Figure 19:
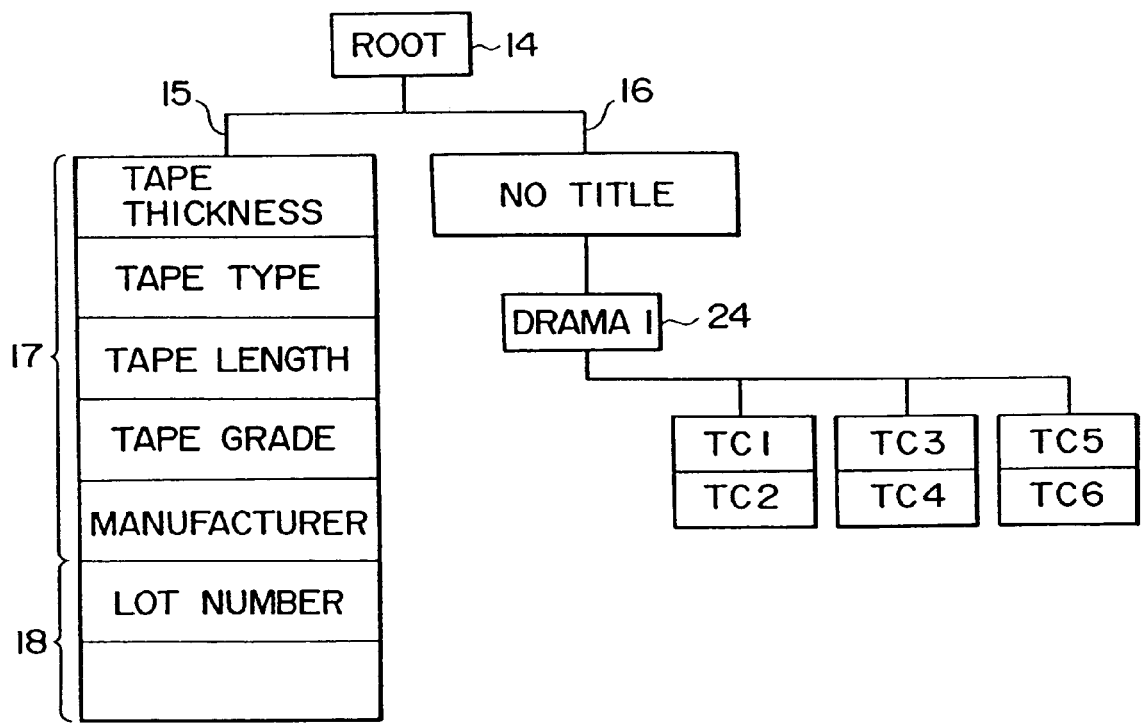
FIG. 19 diagrammatically illustrates association of program segments with the new directory entry of FIGS. 17 and 18.

FIG. 16 illustrates the data structure which exists after three program segments, respectively represented by TC1-TC2, TC3-TC4 and TC5-TC6, have been recorded by three iterations of the steps S9-S15. Gathering of these three program segments together into a group will now be described with reference to FIGS. 17-19. First, as shown in FIG. 17, a new directory entry 23 is created without any identifying information having been applied thereto. Next, a name such as "DRAMA 1" is applied to the newly created directory entry, as shown in FIG. 18. Then, by entry of suitable commands, the three program segments TC1-TC2, TC3-TC4 and TC5-TC6 are subsumed under the directory item "DRAMA 1", now indicated by reference numeral 24 in FIG. 19. In other words, the three program segments are associated with the directory entry "DRAMA 1" and are placed at a level below the level of the directory entry "DRAMA 1".

Figure 20:
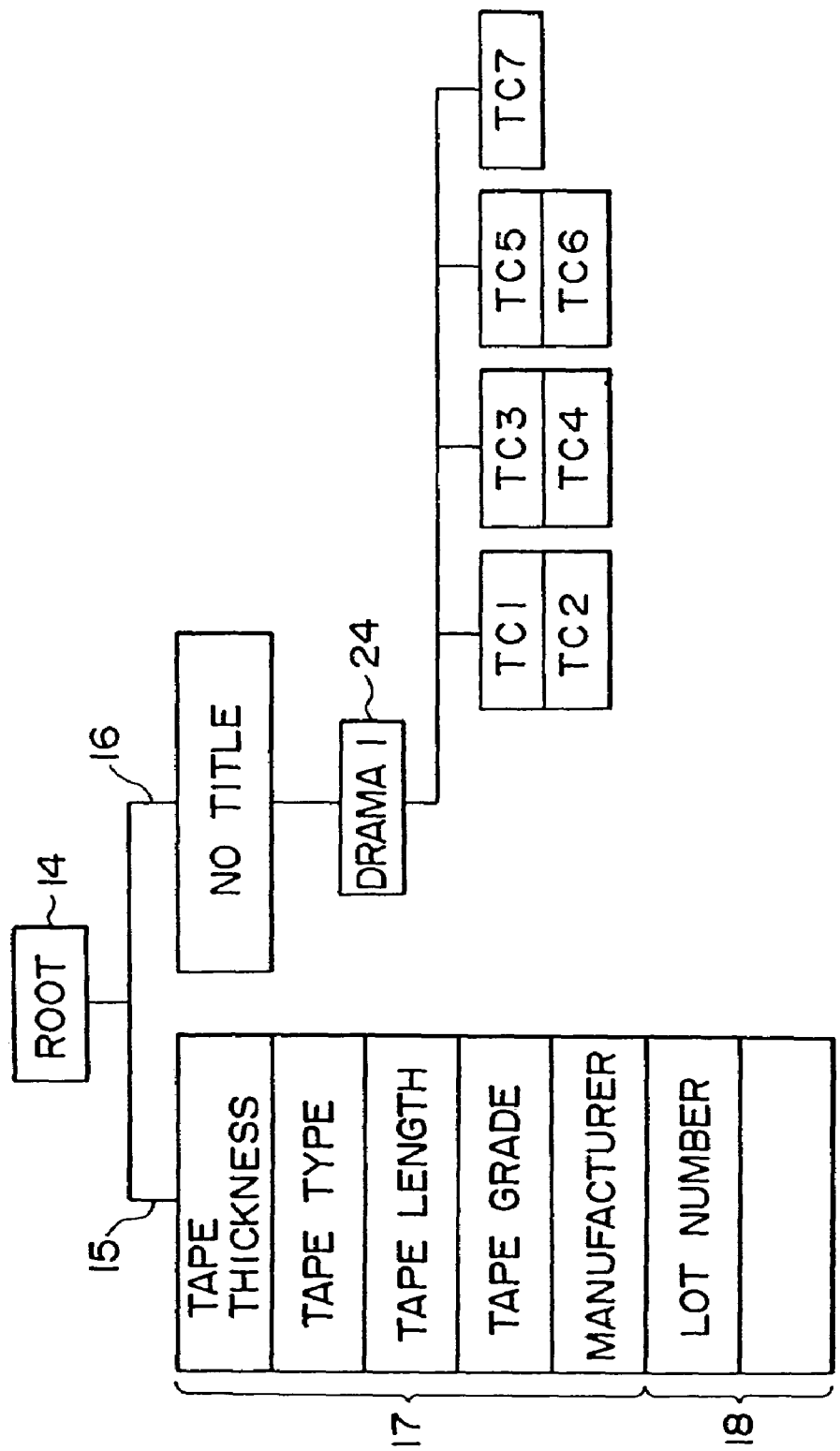
FIG. 20 diagrammatically illustrates addition of a new data item to the tree structure of FIG. 19 upon commencement of a signal recording operation.
Figure 21:
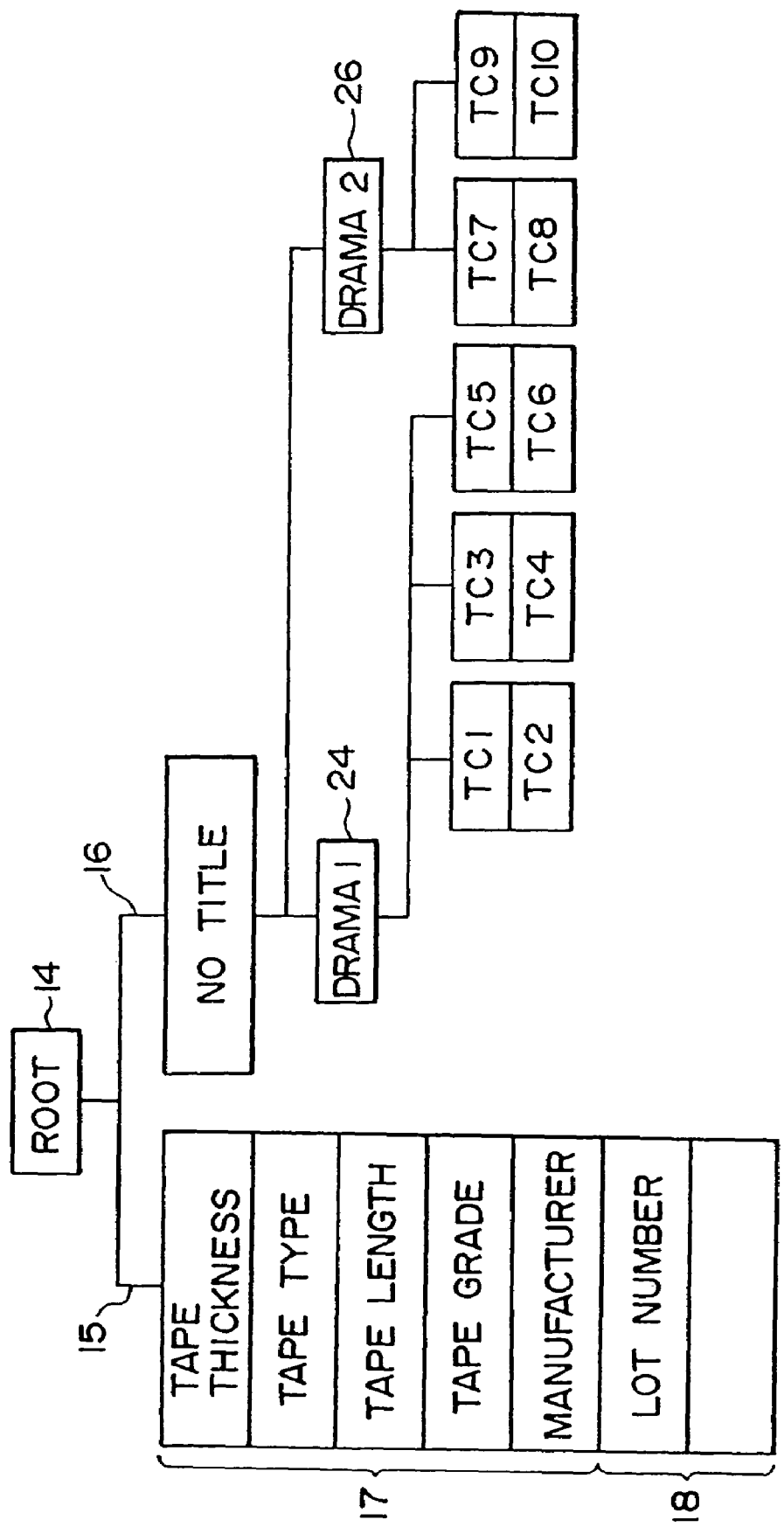
FIG. 21 diagrammatically illustrates modification of the tree structure of FIG. 20 by the addition of another directory entry with program segments associated therewith.

At this point, if the user selects the "DRAMA 1" entry and then proceeds to record material, a new directory entry including the recording start point time code TC7 is formed at a level below, and associated with, the "DRAMA 1" entry, as shown in FIG. 20. Several new directory entries produced in this manner may subsequently be gathered together under a new directory entry such as "DRAMA 2", as shown in FIG. 21, in a manner similar to that shown with respect to FIGS. 17-19. In the particular example shown in FIG. 21, it will be understood that three program segments are associated with the higher level directory entry "DRAMA 1" (reference numeral 24) while two program segments (TC7-TC8 and TC9-TC10) are associated with the directory entry "DRAMA 2" (reference numeral 26) which is at the same level as the directory entry "DRAMA 1".

Figure 22:
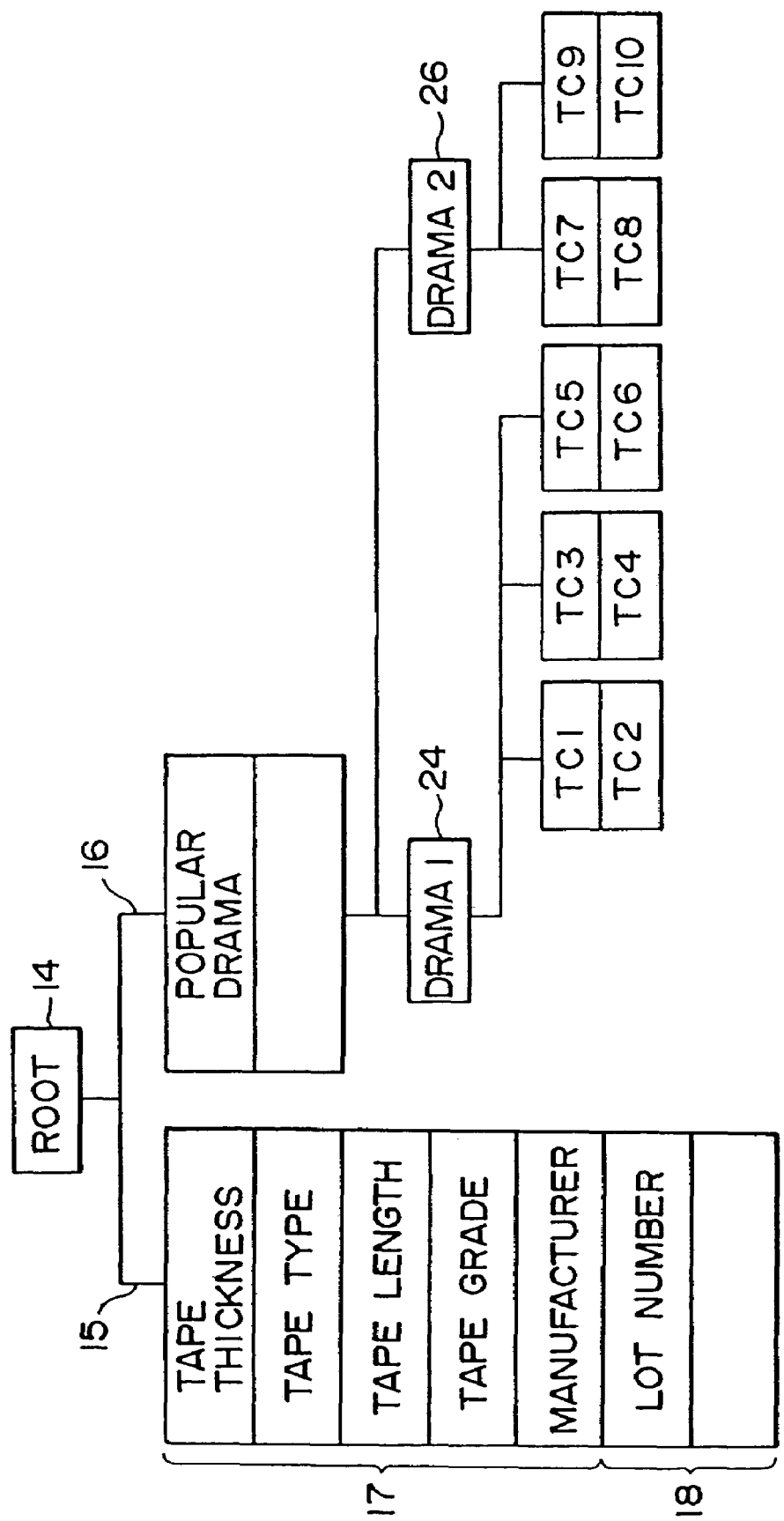
FIG. 22 diagrammatically illustrates modification of the tree structure of FIG. 21 by applying a title to a previously untitled directory entry.

To complete the directory structure, the heretofore untitled cartridge may be assigned a title such as "POPULAR DRAMA" as shown in FIG. 22.

As discussed previously in connection with FIG. 13, the user interface for carrying out the functions illustrated in FIGS. 15-22 may include displaying on TV receiver 52 some or all of the tree structures shown in FIGS. 16-22, and operating a track ball, "select" key, etc. provided on remote control unit 54 for selection of menu items and/or creation of new files or manipulation of existing files. The interface may resemble, for example, that of conventional "desktop" file management and/or drawing/flow-charting software packages. Alternatively, a largely menu-based interface may be provided. In the latter case, menu items such as "CREATE NEW DIRECTORY ENTRY", "APPLY NAME TO DIRECTORY ENTRY", "SELECT PROGRAM", "ASSOCIATE PROGRAM WITH DIRECTORY ENTRY", etc. may be used.

Figure 23:
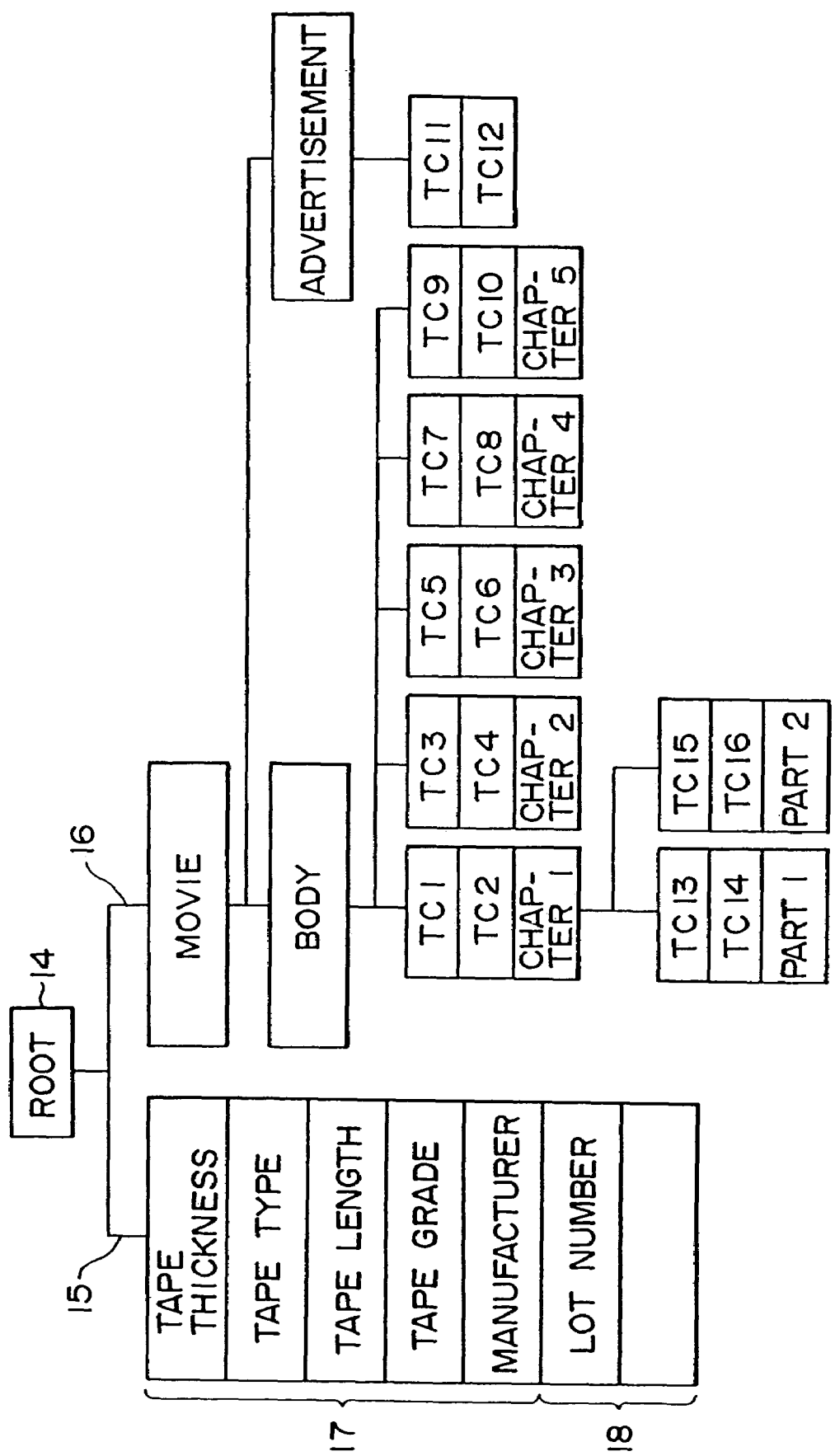
FIG. 23 diagrammatically illustrates a tree structure for information stored with respect to program materials on a pre-recorded tape.

It has been noted that the directory structure described above with reference to FIGS. 15-22 is for a user tape. The directory provided with a pre-recorded tape will be explained now with reference to FIG. 23. It will be understood that in a pre-recorded tape, normally the entire tape has material recorded continuously thereon from beginning to end. The directory structure for the tape, as shown in FIG. 23, like the user tape directory, includes a root item 14 (which may be phantom item), a cartridge information branch 15 containing information of the type previously described with reference to the corresponding branch in the user tape directory, and a recorded content branch 16, which comes fully formed with appropriate directory entries as shown in FIG. 23. More particularly, a cartridge title, typically corresponding to the title of the program material (such as a "MOVIE") recorded therein is present in branch 16, along with two title level directory entries, one of which indicates the body of the material (such as the movie itself) and the other of which indicates additional material such as a "trailer" or other advertising material. The "body" title level entry has associated therewith five chapter level entries each including chapter identifying data and corresponding starting and ending time codes. It will also be noted that associated with the chapter 1 entry are two part level entries, also with corresponding starting and ending time codes. The division of the recorded material into chapters and parts is flexible in the sense that the data stored in the memory can be rewritten so as to designate a different number of chapters and parts and/or different starting and ending points for the chapters and parts.

Figure 24:
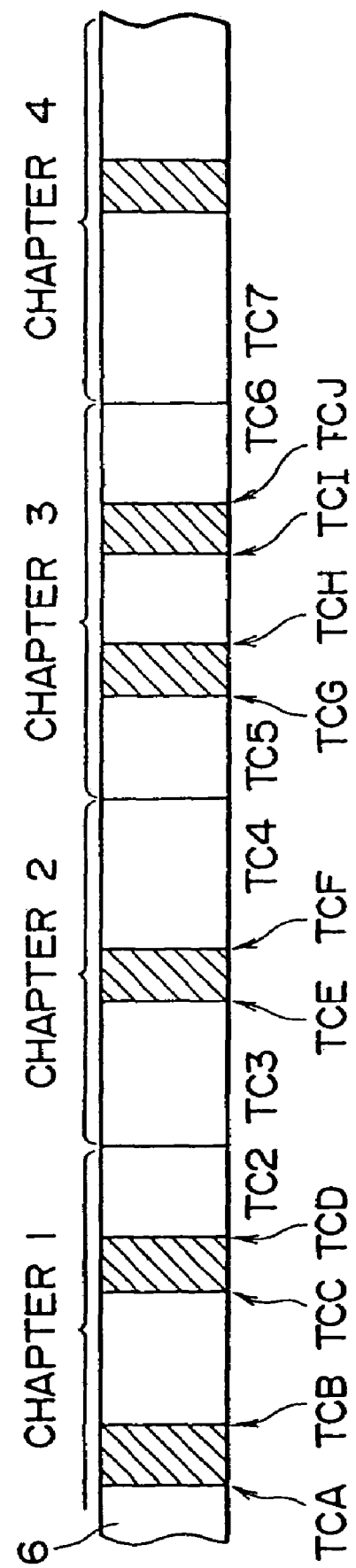
FIG. 24 schematically illustrates recorded signal portions selected to form a digest of a program on a pre-recorded tape.
Figure 25:
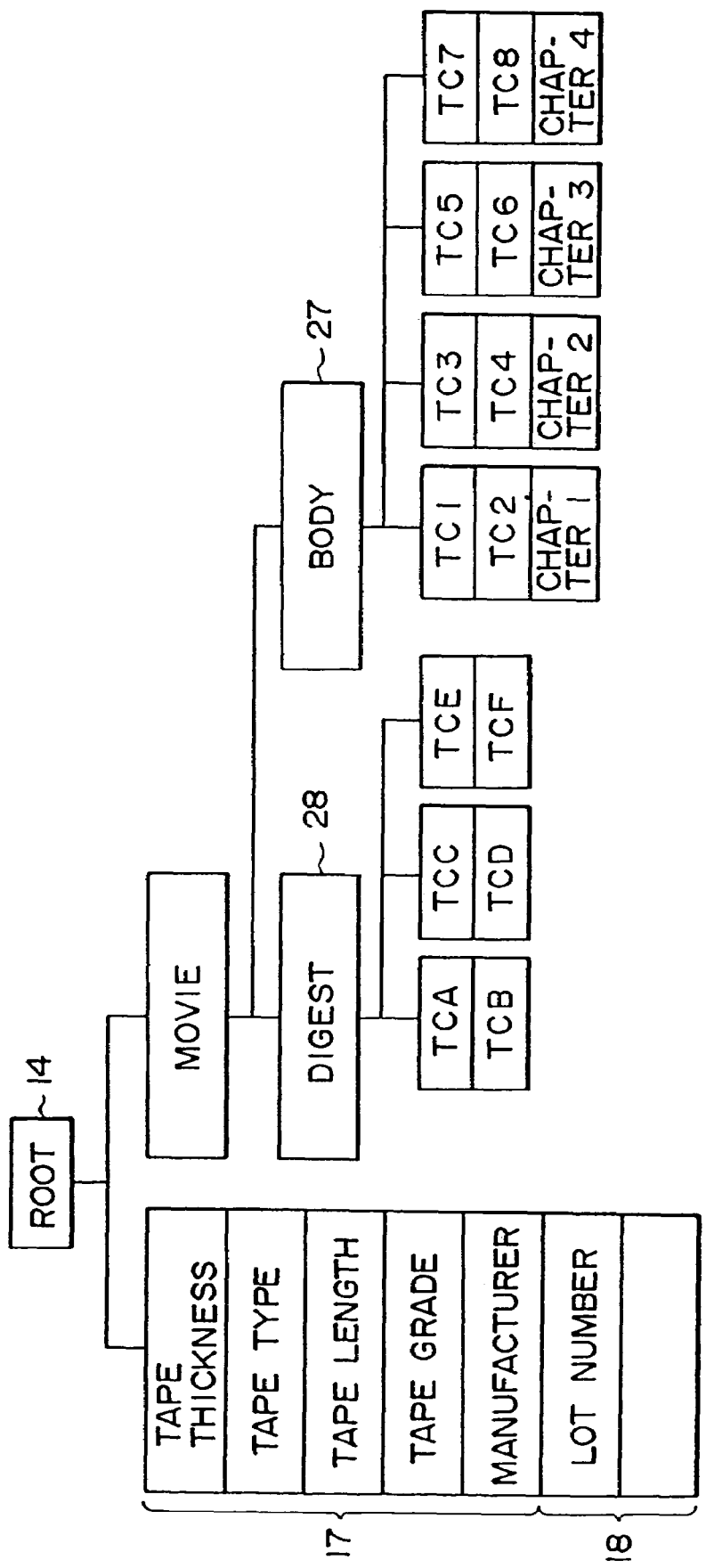
FIG. 25 diagrammatically illustrates a tree structure which includes a directory entry corresponding to the digest illustrated in FIG. 24.

The user is also free to prepare a "digest" of the recorded materials. Referring to FIGS. 24 and 25, a directory entry corresponding to a digest (indicated by reference numeral 28 on FIG. 25) can be created by selecting representative portions of the recorded materials. In particular, in FIG. 24 the portions selected for the digest are shaded, and include portions defined by the pairs of time codes TCA and TCB; TCC and TCD; TCE and TCF; TCG and TCH; and TCI and TCJ. The diagram of FIG. 25 illustrates the data structure at a time when the first three of these segments have been associated with the digest entry 28. It will be noted that the digest entry 28 is at the title level, while the excerpts associated with the digest entry are at the chapter level. Also shown in FIG. 25 are another title level entry with the name "body" indicative of the entire movie, and four chapter level entries associated with the "body" title level entry.

After the digest entry has been formed, selection of the digest entry for reproduction causes only the segments represented by the chapter level entries associated with the digest entry to be reproduced, so that, for instance, representative portions lasting, e.g., thirty minutes are viewed instead of an entire movie that may comprise two hours, for example, of recorded material.

Formation of the digest entry may be carried out using a menu-based and/or graphical user interface such as has been previously discussed with respect to FIGS. 12, 13 and 15-22.

There will now be described a data packet used as a format for storing the information in the recording medium cartridge memory. In a preferred embodiment, all of the information stored in the memory, or all information other than image information, is provided in the form of fixed length packets in the format now to be described. As shown in FIG. 26, the data packet is formed of five data bytes of eight bits each. The first byte, PC0, is data which identifies the type of data contained in the balance of the packet. The format of the last four bytes, PC1-PC4, is determined in accordance with the identifying data contained in the first byte. The last four bytes are for storing the actual data to be included in the packet. The first byte, for the identification information, is divided into an upper four bit segment and a lower four bit segment. The upper four bits are a code indicative of which level in the tree structure the data in the packet belongs to, whereas the lower four bits identify, for example, the type of data contained in the last four bytes of the packet. It will be noted that the upper four bits may indicate one of up to 16 different levels, while the lower four bits may indicate one of up to 16 different types of data.

In particular, with respect to the upper four bits, and referring to FIG. 27, there are shown four different level codes as defined in a preferred embodiment of the invention. Specifically, the code 0001 corresponds to the title level, 0010 corresponds to the chapter level, 0011 corresponds to the part level, and 0100 corresponds to the program level. Other codes, of course, can also be defined. Since the first four bits of the first byte indicate the tree level, the level to which the data belongs can be determined simply by reading the first four bits of the first byte of the data packet.

There will now be described additional details concerning storage of information in, and retrieval of information from, the recording medium cartridge memory.

Figure 32:
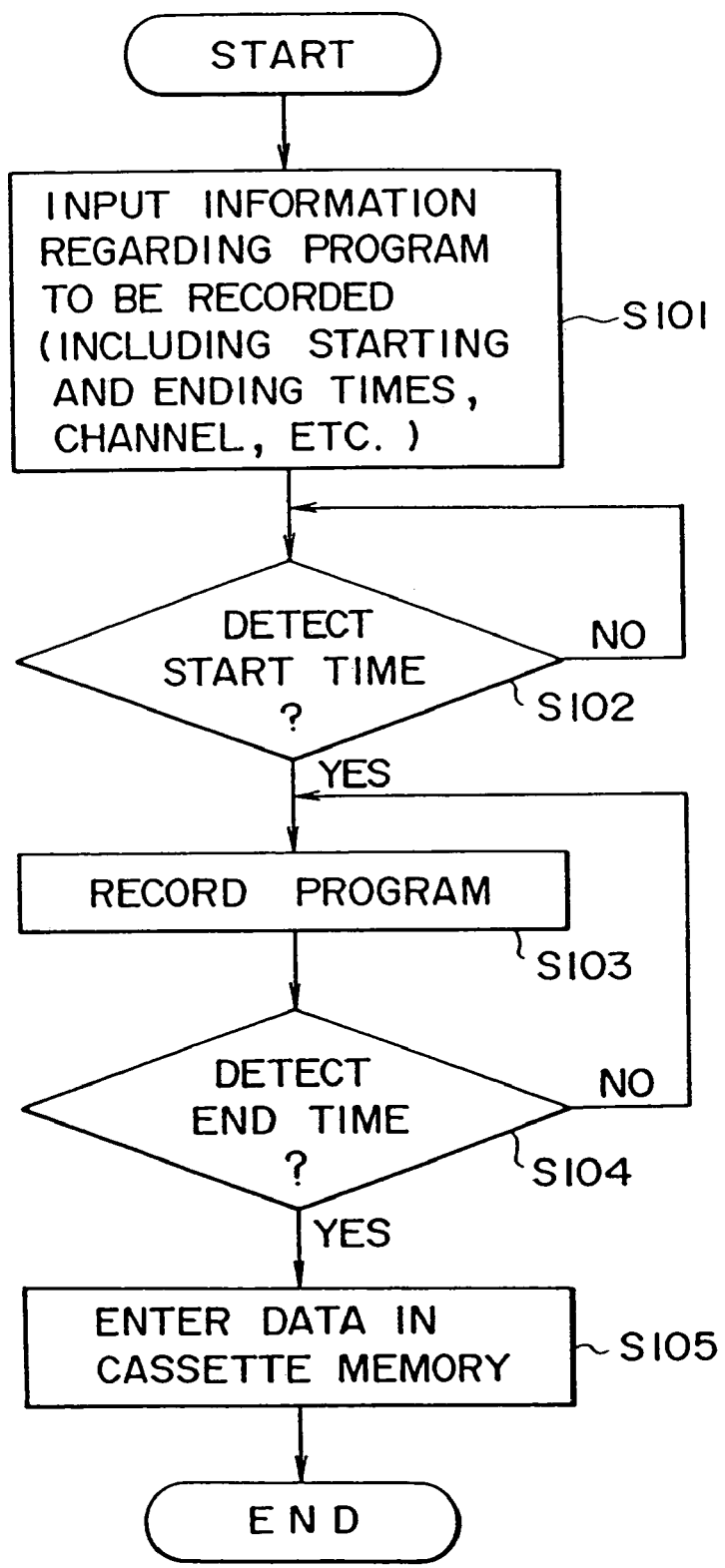
FIG. 32 is a flow chart of a procedure for entering data items in a recording medium cartridge memory in accordance with the present invention.

In particular, FIG. 32 illustrates an alternative manner in which directory entries may be created in connection with recording operations. In the procedure illustrated in FIG. 32, a recording operation begins with step S101 at which a recording and reproducing apparatus (such as VTR 51 of FIG. 31) is preprogrammed to carry out a recording operation. The preprogramming is carried out in a conventional manner, including, for example, input of information regarding the program to be recorded such as the starting and ending times of the program and the channel on which the program will be broadcast. Alternatively, a system in which the program is identified by a code may be used, in which case the appropriate code information is input. The procedure continues with step S102, at which the recording and reproducing apparatus determines whether the input starting time has occurred. The recording and reproducing apparatus continues to await the starting time until it occurs, and when the starting time is detected, the apparatus commences recording the program (step S103). The recording continues and at the same time the apparatus awaits the entered ending time (step S104), at which point recording ceases and the operation ends with entry of appropriate starting and ending point data in the cassette memory (step S105). It will be appreciated that the creation of the directory entry may take place beginning with step S103 (i.e., at the commencement of the recording operation), with the ending point being entered on detection of the end time, and termination of recording, in step S105. Each of the starting and the ending time may be provided in the form of a code representing a time code or a frame number, and each code may be stored in a separate data packet of the type described with reference to FIGS. 26 and 27. Thus, the two data packets respectively corresponding to the starting point and the ending point together form a basic data item of the type shown in FIG. 1(a) or 1(b).

Moreover, step S105 may include the addition of other information to the basic data item, as was described with respect to FIGS. 3-5. That information may include text information such as a program name or a date of recording and/or may include image data representing a frame of the recorded material.

Figure 33:
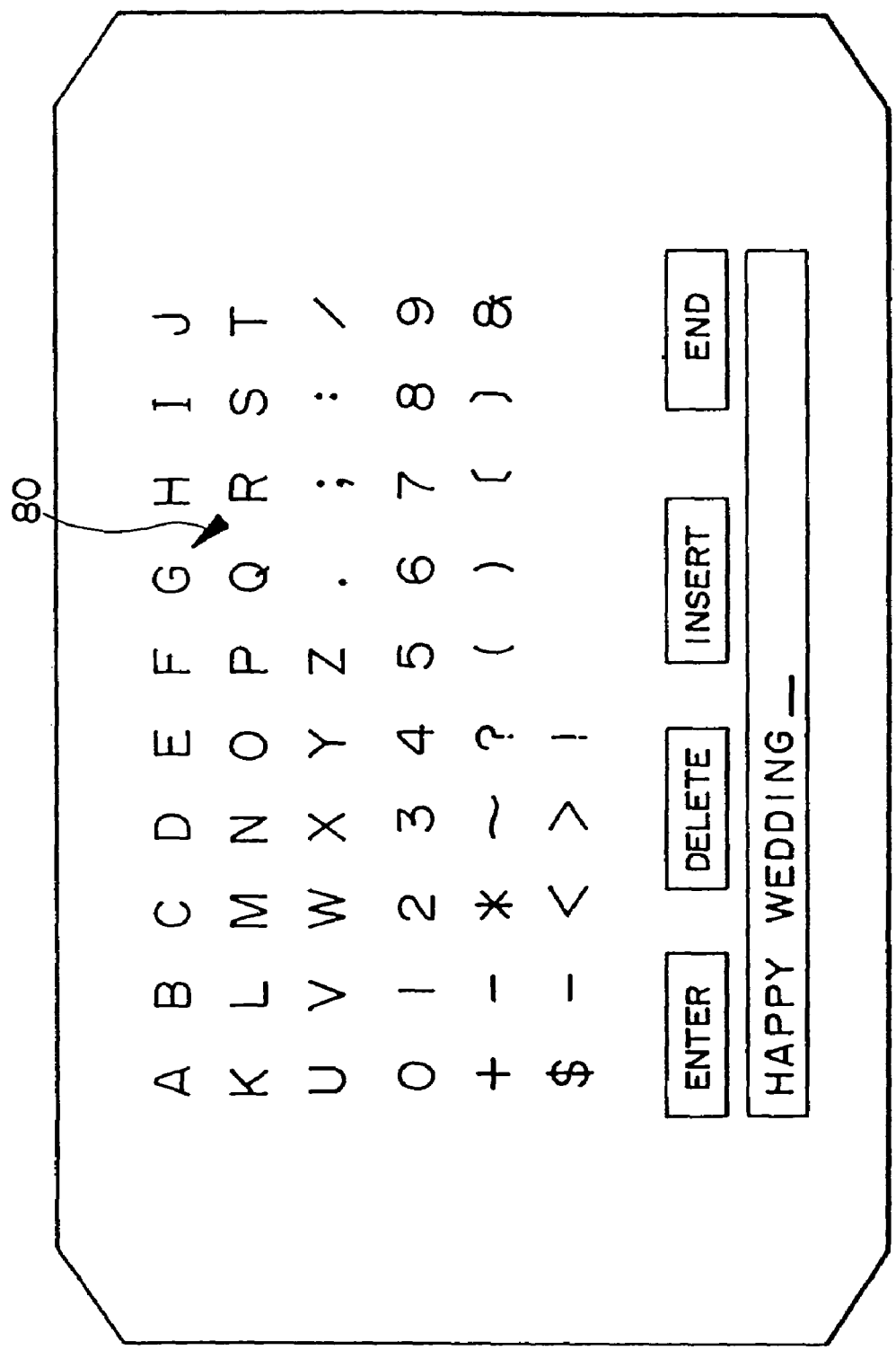
FIG. 33 illustrates a screen display viewed by the user during entry of text information into the recording medium cartridge memory.

With respect to text data, the text to be added to the data item may be formed by operating the remote control unit 54 (FIG. 31) in response to a text editing display displayed on the TV 52, such as that shown in FIG. 33. Referring to FIG. 33, it will be noted that the text editing display includes a list of alpha-numeric and other characters, as well as function "buttons" and an accumulated text display line used for text editing. The display also has a cursor (indicated by reference numeral 80) which may be repositioned by operating directional keys or the like on the remote control unit. Operation of a "select" key or the like on the remote control unit 54 results in selection of the character or function to which the cursor is pointing.

Some or all of the identifying information may also be provided by means of the VBID decoder 70 of the VTR 51 (FIG. 31). In particular, the program name and/or the date may be contained in a code present in the vertical blanking interval of the tuned signal provided by tuner 58. The information may be extracted by VBID decoder 70 and provided to microprocessor 64 for storage as part of the data item in the memory 45.

If the additional information to be added to the data item includes an image representative of the recorded material (as in the data item of FIG. 5), the remote control 54 may be operated (by actuating an "INDEX" button for instance) to cause microprocessor 64 to receive (via output processor 62 and frame memory 72) image data representing a frame of a video signal reproduced from the tape 6. Microprocessor 64 then causes the image data to be stored in the memory 45. Alternatively, a frame of image data may be automatically supplied from video signal processor 60 to microprocessor 64 for storage in memory 45 each time recording is initiated.

FIG. 34 illustrates a format in which the information stored in the recording medium cartridge memory may be displayed on the TV receiver 52 (FIG. 31) during, for example, step S3 of FIG. 15. Referring to FIG. 34, it will be observed that a header portion of the display includes title information and other information identifying the cartridge as well as the current date and time. The next entry indicates how much recording capacity remains on the recording medium in the cartridge. There follows, in the form of a table, name and date information and other information concerning three programs recorded on the cartridge. There is also a bar chart indicating the relative lengths of the programs and the unrecorded area in the cartridge.

Although not shown in FIG. 34, the display may also include a cursor or other indication to permit selection of one of the recorded programs for reproduction, editing, and so forth.

FIG. 35 illustrates another format for displaying program index information as, for example, in connection with step S3 of FIG. 15. Referring to FIG. 35, it will be observed that the display is in the form of a split-screen, divided into four quadrants, with the upper left hand, upper right hand and lower left hand quadrants each displaying an image representative of respective program segments that have been recorded on the cartridge. It will be appreciated that this display format may be used when each of the program segments has a corresponding directory entry that includes image data representing a frame of the program segment. Again, although not shown in FIG. 5, a cursor or the like may be used to select for reproduction a program segment represented by the corresponding image frame.

According to the method of storing information in a recording medium cartridge memory as described herein, a number of program segments can be grouped together by storing corresponding data items in the memory in the form of a tree structure. This data structure facilitates retrieval of the information stored in the memory and also facilitates access to the program materials recorded on the recording medium. The information stored in the memory also preferably includes data relating to the recording medium, the manufacturer of the cartridge, and so forth.

The data structure described herein also makes it possible to provide options for the user of the cartridge, including creation of additional data items and adding of identifying information and the like to existing data items to aid in the management of the recording medium cartridge and the materials recorded therein.

It will also be noted that the information stored in the cartridge memory can be conveniently displayed in the form of a table or list, or if image data is stored in the memory, images representative of the recorded materials can be conveniently displayed. Further, the data structure facilitates classification of the various types of recorded materials, so that operation of the recording and reproducing apparatus and management of the recorded materials is made easier.

Although the invention has been described largely in terms of recording of video signals, it should be understood that the invention can also be advantageously applied to music and other types of audio recordings, as well as recording of other types of materials. It should also be understood that the invention may be applied with respect to other types of recording media in addition to video tape cassettes and may be applied in other types of apparatus in addition to video tape recorders.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for reproducing information representative of signals recorded on a recording medium, said recording medium being accommodated within a recording medium cartridge that includes a memory device separate from said recording medium, wherein said information is stored in said memory device in the form of a plurality of data packets, the size and format of said data packets having been determined prior to the storing of said information in said memory device, the method comprising the steps of:

loading said recording medium cartridge into a reproducing apparatus;

transmitting at least some of said information from said memory device included in said recording medium cartridge to said reproducing apparatus; and reproducing said signals in accordance with the transmitted information;

wherein said transmitted information includes data identifying at least two of said signals recorded on said recording medium and specifies a predetermined order for said identified signals, said predetermined order being different from the order in which said signals are recorded on said recording medium;

whereby said information is organized into a hierarchical structure that includes at least a recording medium information branch and a recording content information branch, said recording content information branch including at least two levels, and wherein the transmitted information includes title information, and information that identifies a cartridge, date and time.

* * * * *